(12) United States Patent
Schobel et al.

(10) Patent No.: US 12,127,074 B2
(45) Date of Patent: Oct. 22, 2024

(54) GENERATING UNEXPECTED LOCATION NOTIFICATIONS

(71) Applicant: Apple Inc., Cupertino, CA (US)

(72) Inventors: Andreas E. Schobel, San Francisco, CA (US); Swaminathan Jayaraman, Cupertino, CA (US); Paul W. Salzman, Palo Alto, CA (US); Kevin M. Lynch, Woodside, CA (US); Tommy Rochette, San Jose, CA (US); Albert R. Howard, Sunnyvale, CA (US); Siva Ganesh Movva, Cupertino, CA (US); Thomas Chathoth Abraham, San Francisco, CA (US); Frank De Jong, San Francisco, CA (US); Rachel F. Needle, Oakland, CA (US); David John Williams, San Francisco, CA (US); Raghunandan K. Pai, Saratoga, CA (US); Swadesh Bhattacharya, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 348 days.

(21) Appl. No.: 17/575,888

(22) Filed: Jan. 14, 2022

(65) Prior Publication Data
US 2022/0141623 A1 May 5, 2022

Related U.S. Application Data

(63) Continuation of application No. 16/845,297, filed on Apr. 10, 2020, now Pat. No. 11,228,864.
(Continued)

(51) Int. Cl.
*H04W 4/029* (2018.01)
*G08B 21/02* (2006.01)
(Continued)

(52) U.S. Cl.
CPC ........ *H04W 4/029* (2018.02); *G08B 21/0255* (2013.01); *G08B 21/028* (2013.01);
(Continued)

(58) Field of Classification Search
None
See application file for complete search history.

(56) References Cited

U.S. PATENT DOCUMENTS

| 8,111,154 B1 | 2/2012 | Puri et al. |
| 9,019,077 B2 | 4/2015 | Hazzani |

(Continued)

FOREIGN PATENT DOCUMENTS

| CN | 108318902 A | 7/2018 |
| KR | 10-2010-0084980 A | 7/2010 |

(Continued)

OTHER PUBLICATIONS

Abdullah et al., "Smart Localization and Detection System for School Children", 2018, vol. 10 No. 1-8, pp. 55-59.
(Continued)

*Primary Examiner* — Frantz Bataille
(74) *Attorney, Agent, or Firm* — Invoke

(57) ABSTRACT

In some implementations, a first computing device can send notifications at times that the first computing device is not in an expected location. A user of a second computing device can remotely configure an expected location for the first computing device, which may be a particular location for a certain period of time. During that time, the first computing device can monitor its own location and check whether it is within the expected location. If the first computing device unexpectedly leaves or fails to enter the expected location, the first computing device may transmit a notification to the second computing device. Similarly, if the first computing device loses connectivity with other devices, a server device (Continued)

may notify the second computing device that the location of the first computing device cannot be determined.

21 Claims, 12 Drawing Sheets

Related U.S. Application Data

(60) Provisional application No. 62/843,942, filed on May 6, 2019.

(51) Int. Cl.
| | | |
|---|---|---|
| *H04W 4/021* | (2018.01) | |
| *G06F 21/62* | (2013.01) | |
| *H04W 12/02* | (2009.01) | |
| *H04W 12/03* | (2021.01) | |

(52) U.S. Cl.
CPC ......... *H04W 4/021* (2013.01); *G06F 21/6245* (2013.01); *G08B 21/0294* (2013.01); *H04W 12/02* (2013.01); *H04W 12/03* (2021.01)

(56) References Cited

U.S. PATENT DOCUMENTS

| | | | |
|---|---|---|---|
| 9,392,405 | B1 | 7/2016 | Auvenshine et al. |
| 9,504,004 | B1 | 11/2016 | Auvenshine et al. |
| 10,034,142 | B1 | 7/2018 | Ciecko |
| 2004/0183674 | A1 | 9/2004 | Ruvarac |
| 2009/0249433 | A1 | 10/2009 | Misra et al. |
| 2011/0238302 | A1 | 9/2011 | Lee |
| 2012/0213404 | A1 | 8/2012 | Steiner |
| 2012/0295641 | A1 | 11/2012 | Tsuda |
| 2012/0302256 | A1 | 11/2012 | Pai et al. |
| 2013/0052990 | A1 | 2/2013 | Zhang |
| 2013/0091214 | A1 | 4/2013 | Kellerman et al. |
| 2014/0249877 | A1 | 9/2014 | Hull et al. |
| 2015/0304435 | A1 | 10/2015 | Bravo et al. |
| 2015/0334533 | A1 | 11/2015 | Luo et al. |
| 2015/0350827 | A1 | 12/2015 | Birch et al. |
| 2016/0295448 | A1 | 10/2016 | Cai |
| 2016/0357393 | A1 | 12/2016 | Gross |
| 2017/0132900 | A1 | 5/2017 | Lee et al. |
| 2017/0154347 | A1 | 6/2017 | Bateman |
| 2017/0177937 | A1 | 6/2017 | Harmsen et al. |
| 2018/0046973 | A1 | 2/2018 | Jones et al. |
| 2018/0196880 | A1 | 7/2018 | Carter |
| 2019/0028836 | A1 | 1/2019 | Pang |
| 2019/0090197 | A1 | 3/2019 | Priness et al. |
| 2020/0014673 | A1* | 1/2020 | Morgantini ............ H04L 63/102 |
| 2020/0250737 | A1* | 8/2020 | Wallace ............. G06Q 30/0639 |
| 2020/0315452 | A1 | 10/2020 | Dirghangi et al. |
| 2020/0371255 | A1 | 11/2020 | Broers et al. |

FOREIGN PATENT DOCUMENTS

| | | |
|---|---|---|
| KR | 10-2012-0131106 A | 12/2012 |
| KR | 10-2015-0100781 A | 9/2015 |
| KR | 10-2015-0144601 A | 12/2015 |
| KR | 10-2016-0075080 A | 6/2016 |
| KR | 10-2019-0010739 A | 1/2019 |
| WO | 2016/067125 A1 | 5/2016 |

OTHER PUBLICATIONS

Asundkar et al., "Enhance Safety Security and Tracking System For School Bus And Children", International Journal of Innovations in Engineering Research and Technology, Jun. 26, 2021, pp. 162-166.

* cited by examiner

GENERATING UNEXPECTED LOCATION NOTIFICATIONS

RELATED APPLICATIONS

This application claims the benefit of the filing date of U.S. Non-Provisional patent application Ser. No. 16/845,297, filed on Apr. 10, 2020 and U.S. Provisional Patent Application No. 62/843,942, filed on May 6, 2019, which are incorporated herein by reference.

TECHNICAL FIELD

The disclosure generally relates to receiving notifications at one computing device when another computing device is not at an expected location.

BACKGROUND

Many users may have mobile computing devices that can determine the user's location. The user's location can be stored on the mobile computing device. The mobile device may determine location using several methods such as GPS, Wi-Fi, or other methods.

SUMMARY

In some implementations, a first computing device can send notifications to a second computing device when the first computing device is not in an expected location. A user (e.g. a parent or guardian) of a second computing device can remotely configure an expected location for the first computing device (e.g., associated with a child), which may be a particular location for a certain period of time. During that time, the first computing device can monitor its own location and check whether it is within the expected location. If the first computing device leaves or fails to enter the expected location during the configured time period, the first computing device can transmit a notification to the second computing device indicating that the second computing device is not at the expected location. Similarly, if the first computing device loses connectivity with other devices, the second computing device provides a notification to the user (e.g., the parent or guardian) that the location of the first computing device cannot be determined.

Particular implementations provide at least the following advantages. For example, particular implementations provide a parent with ways to define expected locations for a child's device and receive notifications if the child's device is not at the expected location. This improves the child's safety because the child's device can be used to ensure that the child is in an expected and safe location (e.g., a school) rather than an unsafe location. The notifications improve the parent's use of her computing device as the parent receives notifications rather than having to contact the child periodically or worry about the child's location. These implementations are quicker than known methods because the parent can immediately receive a notification rather than be notified by another person that the child is missing. Particular implementations are advantageous because the parent is notified even when the child's device is unreachable when it was expected to notify regarding its location. This again improves the parent's knowledge of the child's location as the parent can then use some other method to locate the child. Also, the child's device monitors its own location and does not exchange location information with, for example, a server. The child's device may perform low-power location checks relative to the device's surrounding location rather than making power-intensive location determinations that require communicating with external servers and making more complex location calculations. This reduces battery usage, data usage, and processor cycles for the child's device. It also increases privacy for the child as no other device tracks or otherwise processes the child's location.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Figure 1:
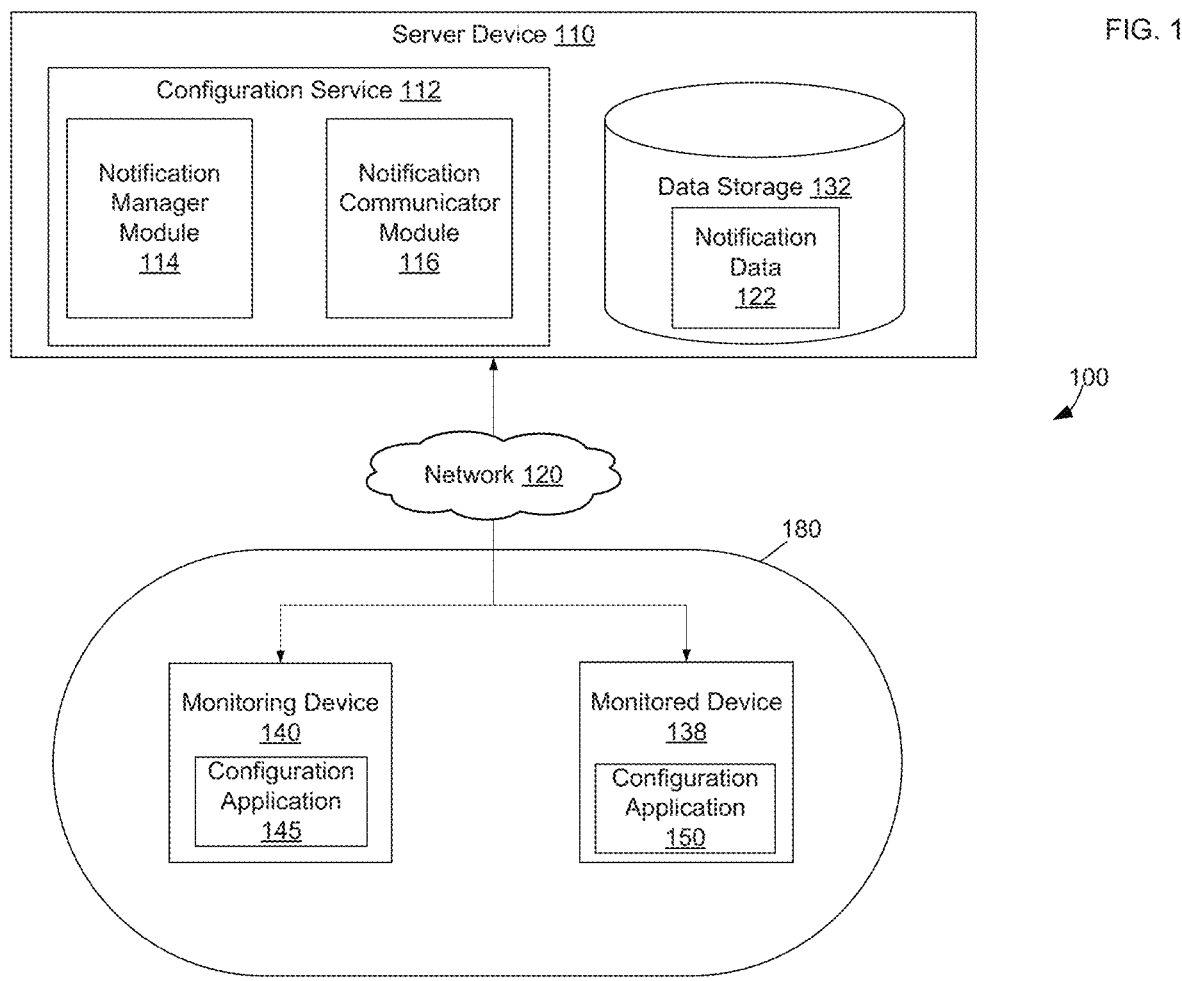
FIG. 1 is a block diagram of an example system for unexpected location notifications.

FIG. 1 is a block diagram of an example system 100 for generating unexpected location notifications. A person may configure a computing device for the person's personal use and as a monitoring device. The person may configure other devices as monitored devices that are subsidiary to the monitoring device in that the monitored devices accept remotely generated configurations that affect usage of the monitored device.

For example, a parent may wish to determine when a child deviates from an expected routine or leaves an expected location (e.g., school, home, etc.) during the course of the day when the parent may not be able to physically observe the child. The parent can use monitoring device 140 to create expected locations for the monitored device 138 (e.g., using the child's device as proxy for the child) and send the expected locations to the monitored device 138. Monitored device 138 can monitor the location of monitored device during the time periods specified for the expected locations and notify the monitoring device 140 (e.g., the parent's device) when the child is not at the expected locations during the specified time periods.

Referring to FIG. 1, in some embodiments, system 100 can include monitoring device 140 and monitored device 138. Any of monitoring device 140 and monitored device 138 can be a laptop computer, desktop computer, smartphone, tablet computer, wearable device (e.g., smartwatch), or any other computing device. For example, system 100 can be a unexpected location notification system that provides a user (e.g., parent or other authorized family member) of monitoring device 140 the ability to remotely create expected location configurations for monitored device 138 (e.g., associated with children or other family members) through network 120 (e.g., a local area network, wide area network, the Internet, etc.) and/or server device 110. System 100 can also provide the operator of monitoring device 140 the ability to receive notifications when a monitored device is not at an expected location or does not provide notification of being at an expected location at a certain time (e.g., due to the monitored device losing connectivity).

In some embodiments, monitoring device 140 may generate expected location configurations for monitored device 138. For example, a parent may use configuration application 145 at monitoring device 140 to create an expected location configuration. The expected location configuration can include a variety of particular specifications. For example, the expected location configuration can include a geofence and/or geofence specification.

In some embodiments, the parent defines an expected location as a geofence. A geofence may be a virtual geographic boundary that represents a real world location in virtual terms. In some embodiments, the parent defines the geofence specification in terms of, for example, geographic coordinates, distance measures, or the like. For example, configuration application 145 may provide one or more interfaces for the parent to view a location on a map, draw boundaries to form a geofence, or the like. Configuration application 145 may also receive text-based location inputs (e.g., addresses). The created geofence may accurately track the boundaries of a location (e.g., walls of a building) or may be an approximate shape that encloses the location (e.g., a circle large enough to encompass the entire building). The parent may enforce the created geofence as the expected location on a targeted monitored device.

In addition to the geofence or geofence specification, the expected location configuration may also include a time period and a targeted monitored device 138. The parent may define the time period as the time that the geofence represents the expected location for the monitored device. In some embodiments, configuration application 145 may generate a data structure or structured data object that represents the expected location configuration. The data structure may be configured to be consumable by, for example, monitored device 138.

In some embodiments, monitoring device 140 may be configured to send the expected location configuration to monitored device 138. For example, the monitoring device 140 can send the expected location configuration to the monitored device 138 through server 110. Monitoring device 140 can send these configurations to monitored device 138 directly through a peer to peer connection (e.g., Bluetooth, peer-to-peer Wi-Fi, etc.) or through some other network connection that does not include server 110.

In some embodiments, a parent and a child may each use a computing device that is registered within a group of devices (e.g., a family group) that are associated with each other. In other embodiments, each device may be operated using a certain user account. A family of users (e.g., two parents and their children) may each have a particular user account, for example. The family's user accounts may be associated together in a user account family or user account network. The associations between user accounts may be further defined. For example, when purchasing or activating the devices, a parent may configure one account that can configure or control how the other accounts are used. Similarly, the parent account may be given authorization to, on a child's computing device, enforce expected location configurations and receive notifications of unexpected location.

Additionally, the described expected location configurations may be applied to any monitored device, not just one operated by a child. For example, a person may wish to apply similar expected location configurations to the monitored device of an older user, a user with a disability, or anyone with a limited ability to productively or responsibly use a mobile device without causing device errors or inconveniences to the user. As an example of this usage context, a person may use monitoring device 140 to implement an expected location configuration on monitored device 138 operated by an elderly user (e.g., an elderly parent). The person may wish to ensure that the elderly user's preferred device settings remain in place and are not altered by accidental modifications by the elderly user until such time as the elderly user becomes more familiar with the device. Similarly, a person may create expected location configurations for a vision-impaired user that later prohibit changes to certain audio or touch input settings so that the vision-impaired user can use the device without accidentally altering critical settings (e.g., by accidentally disabling touch input or audio output, etc.)

The expected location configurations that may be specified by a user, (e.g., configurations based on time, geolocation, device environment/condition, etc.), as well as any communications corresponding to those configurations, may be encrypted in an end-to-end encrypted manner as described herein. In this way, the configuration data is only accessible by the devices associated with the user (e.g., and/or children) and not by a server (e.g., server 110), thereby protecting user privacy.

In some embodiments, each of monitoring device 140 and monitored device 138 are included within a family of associated devices as described above. Accordingly, FIG. 1 shows monitoring device 140 and monitored device 138 in a family group 180. In other embodiments, these devices are not associated as devices, but the accounts used with each device are associated together as a family of user accounts as described above. Each device may execute user applications that different users use with regard to the expected location configurations. For example, a parent may use configuration application 145 of monitoring device 140 to generate an expected location configuration. The parent may then transmit the generated expected location configuration from monitoring device 140 to, for example, monitored device 138 being used by one of the parent's children. Monitoring device 140 may also be used to communicate with server device 110 and receive notifications from actions at a monitored device.

In some embodiments, monitored device 138 receives a data message including an expected location configuration. Monitored device 138 may receive the data message from server device 110. Monitored device 138 may be configured to identify, based on the data message, an account identifier associated with the expected location configuration.

Monitored device 138 may be configured to determine that the account identifier is a member of a trusted group of account identifiers (e.g., a family group). For example, monitored device 138 may recognize the account identifier of a parent. As another example, monitored device 138 may recognize the account identifier to belong to a family of account identifiers (e.g., a family of users) that also includes the user account identifier currently being used with monitored device 138. In response to determining that the account identifier associated with the received expected location configuration is authorized, monitored device 138 may be configured to automatically apply the expected location configuration. In one embodiment, monitored device 138 implements the expected location configuration to compare its current location against an expected location for a specified time and transmit notifications to monitoring device 140 if monitored device 138 determines that it is in an unexpected location.

In some embodiments, the expected location configuration causes changes to the default configuration of monitored device 138. For example, the expected location configuration may cause monitored device 138 to perform new tasks like periodically comparing the current time to the time period specified in the expected location configuration, periodically checking its own location, comparing its location to another location, and transmitting notifications triggered by the location comparisons.

More specifically, monitored device 138 may be configured by the expected location configuration to periodically detect the current time and determine whether it lies within the specified time period. For example, a parent may create an expected location configuration for a child's monitored device 138 during the time the child is in school (e.g., 9:00 AM to 3:00 PM). Monitored device 138 may be configured to periodically detect its current location (e.g., every 1 minute). Monitored device 138 may be configured to compare its current location with the expected location provided in the expected location configuration. For example, monitored device 138 may compare its current location to the geofence provided in the expected location configuration. Monitored device 138 may use the comparison to determine whether monitored device 138 is inside or outside the geofence. Monitored device 138 may periodically perform the location check and location comparison functions during the time period specified by the expected location configuration. In one embodiment, monitored device 138 checks its own location relative to a local point (e.g., a Wi-Fi device) only. Monitored device 138 may not be configured to provide its location to server device 110. Monitored device 138 may not be configured to respond to location data requests from server device 110 or monitored device 140.

In one embodiment, monitored device 138 may be configured to determine that it is in an unexpected location. For example, monitored device 138 may detect that the current time is within the time period specified in the expected location configuration. Monitored device 138 may determine that its current location is outside the geofence that represents the expected location as described above.

Monitored device 138 may be configured to determine a confidence level associated with expected location notifications. The confidence level may indicate a likelihood that the device is in proximity to or in possession of the child. For example, monitored device 138 may be a wearable device (e.g., a smartwatch) that a child wears on her wrist. Monitored device 138 may be configured to detect whether it is on the child's wrist or not. For example, monitored device 138 may use a number of body temperature, movement, haptic feedback, or other sensors to detect if the child is wearing the device or if it has been left in, for example, a locker or desk. As another example, monitored device 138 may be a mobile telephone device or mobile computing device (that is typically not wearable). Monitored device 138 may be configured to determine whether the child has recently used or moved monitored device 138. Based on data from the one or more sensors, monitored device 138 may determine a confidence level that monitored device 138 is in possession of or proximity to the child.

In one embodiment, monitored device 138 provides the confidence level as part of notifications that it sends to server device 110. For example, monitored device 138 may provide a percentage value, a grade, or some measure on a defined scale to indicate the confidence level. In some embodiments, monitored device 138 may provide the confidence level only when the confidence level is low (e.g., to prompt the parent to take action, such as to locate the child).

Based on the determination, monitored device 138 may be configured to generate an unexpected location notification. In some embodiments, the unexpected location can include an identifier for monitored device 138 and a notification that the monitored device 138 is outside an expected location. In some embodiments, monitored device 138 may not transmit any data regarding the geofence, just that monitored device 138 is outside a geofence that was its expected location. In other embodiments, monitored device 138 may send a geofence identifier for the expected location. For example, there may be cases where monitored device 138 leaves an expected first geofence that overlaps with an unexpected second geofence. In such cases, monitored device 138 may be within the second geofence but this may not be its expected location. Accordingly, monitored device 138 provides the geofence identifier for the geofence that monitored device 138 was required to be in at that time. In some embodiments, the geofence identifier cannot be used to determine the specifications of the geofence. For example, the geofence identifier may be merely a random number that the monitored device 140 created to associate with the geofence when creating the expected location configuration. As another example, the monitored device 140 may generate the geofence identifier using encryption keys that the server device 110 may not have.

In some embodiments, the expected location configuration may cause monitored device 138 to send a notification only if monitored device 138 unexpectedly enters or leaves the geofence. In other embodiments, the expected location configuration may cause monitored device 138 to send a notification each time monitored device 138 enters or leaves the geofence, whether unexpectedly or expectedly. This means that the notification is sent when there is an expected entry, an expected exit, an unexpected entry, and an unexpected exit. In still other embodiments, the notification is sent any time monitored device 138 unexpectedly stays inside the geofence past the time period, or unexpectedly fails to enter the geofence by the start of the time period.

In some embodiments, monitored device 138 may transmit the unexpected location notification to server device 110. Monitored device 138 may transmit notifications to server device 110 in several different situations. For example, monitored device 138 may transmit a notification to server device 110 each time monitored device 138 expectedly enters an expected location or unexpectedly leaves an expected location (e.g., leaves too early or too late). In some embodiments, server device 100 may be configured to pass through notifications to monitoring device 140 only if monitored device 138 reports unexpected behavior. In other words, server device 110 may only forward a notification to monitoring device 140 if monitored device 138 reports that it is in an unexpected location or left an expected location too early or too late. In other embodiments, server device 110 forwards all notifications it receives to monitoring device 140.

In some embodiments, monitored device 138 is alerted each time a new expected location configuration is created for it. For example, a child can view a notification on monitored device 138 that indicates that a parent has a set an expected location configuration on monitored device 138.

In some embodiments, a user of monitored device 138 can be authorized to review, approve, edit, or remove expected location configurations. For example, the user may be notified of a new expected location configuration and provide approval for the expected location configuration before it takes effect. Approval can be provided per expected location. For example, a child may approve an expected location configuration relating to the child's school but deny an expected location configuration relating to the child's home. The child may provide a one-time approval for an expected location configuration. For example, an older child may have greater freedom to move in and out of her school and may only occasionally or temporarily submit to expected location configurations. By contrast, parents of a younger child may want ongoing approval for expected location configurations and, accordingly, a younger child using monitored device 138 may provide an ongoing approval.

Relatedly, monitored device 138 may be notified each time an existing expected location configuration is edited by monitoring device 140. For example, a parent may expand the size of the expected location or increase the associated time period that the child is expected to be within the expected location. Monitored device 138 is notified of these changes and the user (e.g., the child) can elect to approve or deny the changes on a one-time or ongoing basis.

Additionally, each time a notification is provided to a particular monitoring device, monitored device 138 may display a notification as well. For example, if a child leaves an expected location, monitored device 138 will notify monitoring device 140 but also display a notification stating that it is in an unexpected location.

In some embodiments, monitoring device 140 may not receive a notification if monitored device 138 removes an expected location configuration. For example, a child may remove an expected location configuration from monitored device 138. As a result, monitored device 138 may not compare its location to an expected location and may not send any notifications to anyone regardless of the current location of monitored device 138. A parent may take notice of the configuration removal and may discuss with the child why the parent wants expected location configurations to be maintained on monitored device 138.

In certain situations, monitoring device 138 may lose connectivity with server device 110. For example, monitored device 138 may encounter technical issues or weather problems may cause signal loss. In such a situation, server device 110 may receive no communications at all from monitored device 138 (e.g., at a time when an expected location notification was scheduled to be sent). In this situation, server device 110 may forward nothing to monitoring device 140.

Monitoring device 140 may be configured to track whether it received a notification as expected or not (e.g., to account for connectivity loss situations). For example, configuration application 145 may be configured to operate a scheduler module. Using the scheduler module, configuration application 145 may be configured to compare the time period specified in an expected location configuration and the current time. Configuration application 145 may be configured to determine if the current time overlaps with the time period of the expected location configuration. If so, configuration application 145 may be configured to determine whether an expected location configuration specified that an expected location notification be sent (e.g., notify when child enters school at expected time). If an expected location notification was specified, configuration application 145 may determine whether that notification was received at the current time. If an expected location notification was required but not received, configuration application 145 may be configured to display a location-unknown notification for the user (e.g., the parent).

As another example, a person may remove expected location configurations in order to escape location monitoring by a second person that is perceived to be a threat. For example, a first person may be subjected to expected location configurations on her monitored device 138 by a second person that may threaten or hurt the first person if the first person is ever not in a location that the second person expects. The first person may be able to surreptitiously remove expected location configurations. The first person may then be able to escape the expected location without any notification to the second person's monitoring device 140 and attempt to get help from authorities.

FIG. 1 shows that server device 110 includes notification service 112 and data storage 132. Notification service 112 includes notification communicator module 116. Data storage 132 includes configuration data 122. Notification communicator module 116 of server device 110 may be configured to receive expected location configurations from monitoring device 140 and transmit the expected location configuration to monitored device 138. Notification communicator module 116 of server device 110 may also be configured to receive unexpected location notifications from monitored device 138 and transmit the notifications to monitoring device 140.

In some embodiments, notification communicator module 116 receives data transmissions or messages from monitoring device 140 that include expected location configurations and a user account identifier for the user of the targeted monitored device. In some embodiments, monitoring device 140 may encrypt the expected location configurations but not the user account identifier so that notification communicator module 116 is able to transmit the expected location configurations to the correct user.

Data storage 132 includes configuration data 122. Configuration data 122 may include stored encrypted expected location configurations. For example, where server device 110 loses network connectivity via network 120 to, for example, monitored device 138, configuration data 122 may store an expected location configuration received from monitoring device 140. Configuration data 122 may store or cache the expected location configuration until network connectivity is reestablished between server device 110 and monitored device 138.

On monitored device 138, configuration application 150 may be configured to receive and implement expected location configurations and provide notifications of attempts to circumvent configurations. Accordingly, the child may use configuration application 150 at monitored device 138 that is similar to configuration application 145 at monitoring device 140 to review the received expected location configuration and see how its implementation affects the functionality of monitored device 138.

In one embodiment, monitoring device 140 may be configured to encrypt the expected location configuration and transmit it to server device 110 along with an identifier of, for example, monitored device 138. As noted above, any communications between monitored device 138 and monitoring device 140 may be end-to-end encrypted. Server device 110 may not have the ability to decrypt the contents of any encrypted communication. Monitored device 138 may be configured to decrypt the received expected location configuration and apply the settings specified therein on monitored device 138. In one embodiment, monitoring device 140 and monitored device 138 use an encrypted messaging service to communicate with each other whereby server device 110 cannot decrypt or access the contents of any message exchanged between monitoring device 140 and monitored device 138. In another embodiment, monitoring device 140 and monitored device 138 exchange encryption keys using a peer-to-peer communication link that does not involve server device 110. For example, a parent may use a peer-to-peer communication link to exchange encryption keys between the parent's monitoring device 140 and monitored device 138. In this embodiment, monitoring device 140 and monitored device 138 may not use a messaging service that provides encryption but may use separate encryption and decryption capabilities on the devices to secure messages that are sent via server device 110.

In some embodiments, server device 110 cannot decrypt or access the contents of any expected location configuration. For example, while monitored device 138 may have the keys necessary to decrypt the encrypted expected location configurations, server device 110 may not have the encryption keys necessary to decrypt the encrypted expected location configurations. However, server device 110 may be able to read, unencrypted, some portions of the expected location configuration. For example, server device 110 may be able to access a geofence identifier for an expected location and identifiers for monitored device 138 and monitoring device 140 from the expected location configuration. For example, when monitored device 138 sends a notification to server device 110, the notification may include user account identifiers for a user of monitored device 138 (i.e., the source of the notification), user account identifiers for a user of monitoring device 140 (i.e., the ultimate target of the notification), and just an expected location identifier (e.g., a geofence identifier) associated with monitored device 138 at that time. Server device 110 may have previously received these data as part of the expected location configuration and can compare the received data to stored data for monitored device 138. Based on the comparison, server device 110 determines to forward the notification to monitoring device 140. For example, monitored device 138 may report that it is "out" of a particular expected location. Based on the received geofence identifier and/or monitored device identifier and the time, server device 110 identifies that this is unexpected behavior and monitoring device 140 should receive the notification that monitored device 138 is unexpectedly out of an expected location.

Figure 2:
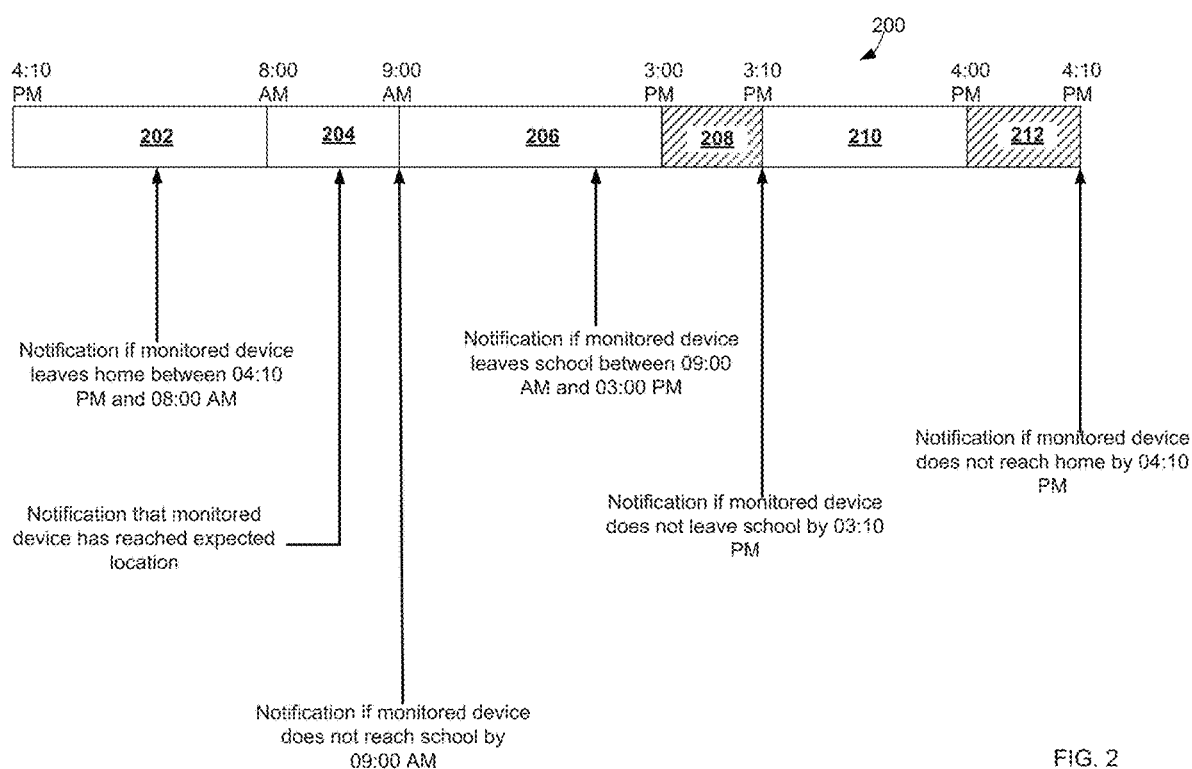
FIG. 2 is a notification timeline diagram illustrating how different notifications may be transmitted based on different expected location configurations and time periods.

FIG. 2 is a notification timeline diagram 200 illustrating how different notifications may be transmitted based on different expected location configurations and time periods. For example, a parent may create different expected location configurations or settings for a child's monitored device for each period illustrated in FIG. 2.

FIG. 2 shows multiple times and reasons that a monitored device may send a notification. In some embodiments, a parent may create an expected location configuration for one or more of these time periods. For example, time period 202 represents the hours between 4:10 PM on one day and 8:00 AM on the next day. For these times, a parent may wish that a child remains in the home and not leave without the parent's permission. Accordingly, the parent may define the home as an expected location and the hours of 4:10 PM to 8:00 AM the next day as the time during which the child's monitored device 138 is supposed to be inside the home. Additionally, in some embodiments, the time zone for the expected location configuration is the time zone of monitored device 138. So 4:10 PM or 8:00 AM in the above example refers to those times when they are reached in the time zone for monitored device 138.

The parent may configure specific notifications with regard to this expected location configuration. Certain notifications may be notifications that the child's device is not in an expected location (e.g., is not at a particular location at a particular time). For example, the parent may wish to be notified each time monitored device 138 leaves the home during the hours of 4:10 PM to 8:00 AM. Relatedly, the parent may wish to be notified only if monitored device 138 leaves the home for more than a certain period of time (e.g., five minutes). For example, the child may briefly leave the home to go to a vehicle or to a neighbor. In this example, such brief exits from the home may not cause the monitored device 138 to generate a notification.

Alternatively, the parent may wish to receive a notification if the child's monitored device 138 enters the home between the hours of 4:10 PM and 8:00 AM. This may be a notification that the child's device has entered an expected location, but the entry is not at an expected time. For example, the parent may have set 4:10 PM as a deadline time before which the child must return from outside the home. If the child is late and returns after 04:10 PM, monitored device 138 may be configured to transmit a notification.

Time period 204 represents the hours between 8:00 AM and 9:00 AM, as shown in FIG. 2. During time period 204, a parent may create an expected location configuration that causes monitored device 138 to send a notification if monitored device 138 does not reach a location by the end of the defined time period. For example, the parent may define the child's school as an expected location for the child after the time 9:00 AM. It may be the parent's understanding that the child is traveling from the home to school between 8:00 AM and 9:00 AM. In other words, the child is neither at the expected location of the home or school but in transit. In some embodiments, a time of transit as described above may not cause monitored device 138 to generate a notification for monitoring device 140. However, if the child does not reach school by 9:00 AM sharp, monitored device 138 may generate a notification. Alternatively, monitored device 138 may generate a notification at the time the child enters the school, such as at 8:40 AM.

Time period 206 represents the hours between 9:00 AM and 3:00 PM. Similar to time period 202 where the home was the expected location, it may be the parent's understanding that the school is the expected location for the child during the hours of 9:00 AM to 3:00 PM. If the monitored device 138 determines that the child has left the school any time between 9:00 AM and 3:00 PM, monitored device 138 may generate a notification indicating that the child has unexpectedly left the expected location and transmit to monitoring device 140.

Referring back briefly to time period 204, the child needed to be in school by 8:00 AM sharp or monitored device 138 generated a notification that the child was not in an expected location. Time period 208 illustrates a contrasting situation involving a flexible time period (or grace period). As shown, time period 208 represents the hours between 3:00 PM and 3:10 PM. As noted above, the school may be an expected location for the child. During time period 208, the parent may expect that the child is leaving school and the parent may expect that the time a child leaves school may be variable (e.g., within a ten-minute range). Between 3:00 PM and 3:10 PM, the child may be, for example, within the school grounds, or getting into a school bus, or being picked up by someone. In other words, any time of arrival between 4:00 PM and 4:10 PM may be considered an expected departure and any notification of departure sent during this time will be an expected departure notification, not an unexpected departure notification. Accordingly, the parent may generate an expected location configuration that causes monitored device 138 to transmit an unexpected location notification only if the child has not left school by 3:10 PM. In other words, if the child has left school by 3:05 PM, or 3:06 PM, no notification may be generated or an expected departure notification may be generated, because monitored device 138 may be configured to treat time period 208 as a flexible time period.

Time period 210, representing 3:10 PM to 4:00 PM, illustrates another time period of transit similar to time period 204. The parent may not have set an expected location configuration for time period 210.

Time period 212, representing 4:00 PM to 4:10 PM, represents another flexible time period or grace period similar to time period 208. During time period 212, a parent may expect that a child is returning home from school and that this return time may be variable (e.g., within a ten-minute range). In other words, any time of arrival between 4:00 PM and 4:10 PM may be considered an expected arrival and any notification of arrival sent during this time will be an expected arrival notification, not an unexpected arrival notification. Various factors may affect the child's return time, such as the time at which the child left school and traffic conditions on the way home. Accordingly, a parent may expect the child to be home by 4:10 PM at the latest and may configure an expected location configuration that causes monitored device 138 to generate an unexpected location notification only if the child is not home by 4:10 PM.

Figure 3:
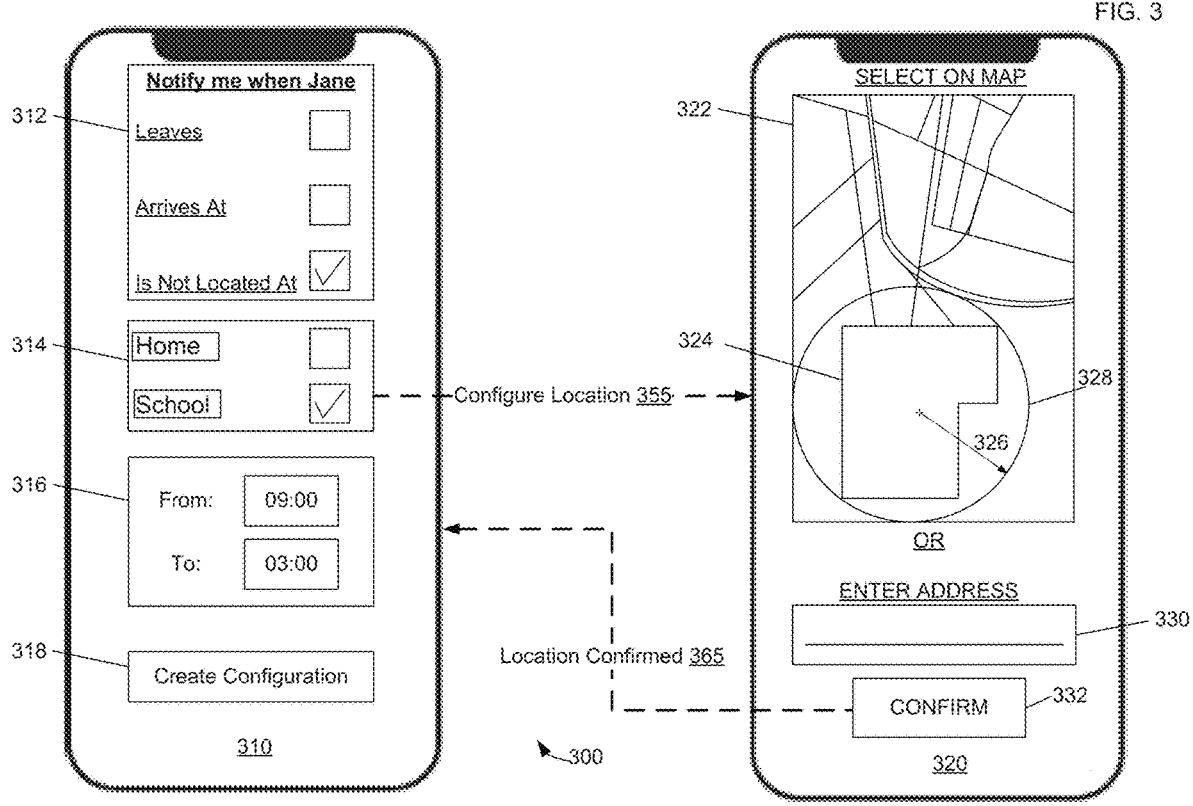
FIG. 3 shows a configuration process by which an expected location configuration can be generated and implemented on a monitored device.

FIG. 3 shows a configuration process 300 by which an expected location configuration can be generated and implemented on a monitored device. In some embodiments, the process of FIG. 3 may be performed using configuration application 145 at monitoring device 140 (shown in FIG. 1). For example, a parent may use the process of FIG. 3 to create an expected location configuration for a monitored device used by a child.

Stage 310 shows a series of configuration options or settings that can be used to generate an expected location configuration. As shown, menu 312 of configuration stage 310 may be used to select settings for when the parent wishes to be notified. The choices may represent notifications when a monitored device 138 leaves an expected location, when a monitored device 138 arrives at an expected location, or when a monitored device 138 is not located at an expected location.

Menu 314 may display a list of locations that could be an expected location for a monitored device 138. For example, for a child, expected locations may include the child's home and the child's school.

These expected locations may be configured by the parent in various ways. The parent may import location data from a different application into the configuration process of FIG. 3. For example, the parent may access a contacts application on monitoring device 140. The contacts application may store contact data for the child's school. For example, the contact data may include a school name, a school address, school emergency contacts, contact information for key people at the school (e.g., the principal, the child's teachers), school hours, and a school map. The parent may import some or all of this data into configuration application 145. For example, the parent may import the school's address into configuration application 145 and save the address as an expected location. The expected location may be labeled in configuration application 145 with the school name.

Alternatively, the parent may configure the expected location using stage 312. In some embodiments, the parent may manually enter a location label or tap a previously created label to transition to stage 312, as shown by transition step 355.

Stage 312 may provide at least one of two options to help a parent configure an expected location. In some embodiments, the parent may be able to select a location using a map display 322. For example, the parent may use map display 322 to navigate to a map view of the child's school. For example, the child's school may be shown as building 324. The parent may wish to define an expected location with respect to building 324. In some embodiments, the parent may select building 324 and define a circle 328 around building 324 of radius 326. The circle may represent an expected location. In other embodiments (not shown), the parent may select building 324 and just enter a numerical radius of a certain distance. In still other embodiments, the parent may configure the expected location to be the precise boundaries of building 324, rather than a circle that includes building 324 and some additional areas. Stage 312 may also provide the parent with the ability to use textbox 330 to enter a specific address as the expected location (e.g., the street address of the child's school).

Once the expected location is configured, the parent may confirm using confirmation control 332 and return to stage 310 as shown by transition step 365. At stage 310, the parent may set the time that applies to the expected location configuration using menu 316. For example, the parent may set the time that the child is expected to be in school as from 9:00 AM to 3:00 PM. In another embodiment, the parent may import school hours data from the contacts application as described above and automatically populate menu 316 with the imported school hours data. Once each configuration option has been selected, the parent may confirm creation of the expected location configuration using confirmation control 318 of stage 310. In some embodiments, selecting confirmation control 318 causes monitoring device 140 to automatically transmit the new expected location configuration to server device 110 for transmission to monitored device 138.

In some embodiments, one monitoring device can create multiple expected location configurations for the same monitored device. For example, monitoring device 140 can create each of the notifications shown in FIG. 2 using the process of FIG. 3 for monitored device 138. Moreover, one monitoring device can create expected location configurations for multiple monitored devices. For example, a parent using monitoring device 140 can create expected location configurations for a child that is using monitored device 138 and for another child that may be using another monitored device.

Additionally, one monitored device can provide notifications to multiple monitoring devices. In other words, monitored device 138 may be configured to provide notifications to monitoring device 140 but also another device. For example, one parent using monitoring device 140 may create an expected location configuration for a child that is using monitored device 138. The parent may configure that notifications from monitored device 138 be received at monitoring device 140 and also a device used by the child's other parent.

Furthermore, the parent may set an expected location configuration to be recurring (e.g., for every weekday during a week). As described above, a parent may import school hours data from another application, such as a contacts application. Similarly, the parent may import weekly or monthly schedule data or calendar data for the school year from a calendar application. The parent may configure expected locations for the child based on the schedule data or calendar data. For example, a child may be expected to be in school for every day in the current week except for Friday, which may be a school holiday. Accordingly, the parent can adjust any recurrence according to the imported calendar data. As another example, the child may have reduced hours on Fridays. So, the parent may create a recurring expected location configuration for Monday through Thursday and a separate expected location configuration for Friday.

Figure 4:
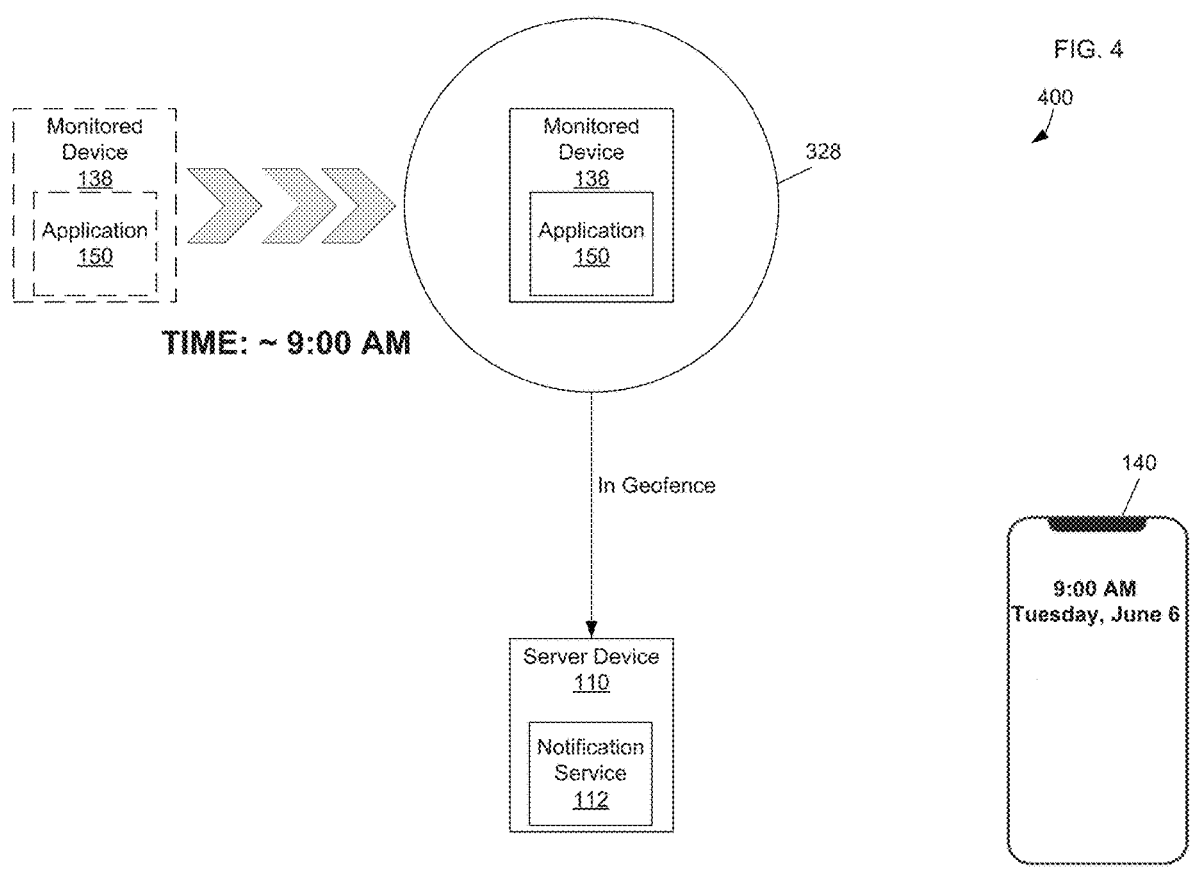
FIG. 4 is an example of a monitored device transmitting an expected location notification as it enters an expected location.

FIG. 4 illustrates an example 400 of a monitored device transmitting a notification based on an expected location configuration. More specifically, FIG. 4 is an example of a monitored device transmitting an expected location notification to server device 110 when it is entering an expected location.

FIG. 4 shows monitored device 138 entering expected location 328. Expected location 328 shown in FIG. 4 may be similar to expected location 328 shown in FIG. 3 that was created by the parent using monitoring device 140. In some embodiments, monitored device 138 transmits the expected location notification to server device 110 as it crosses the boundary of the geofence corresponding to expected location 328.

The applicable expected location configuration may dictate that the child should be in school by 9:00 AM. If the child enters before or at 9:00 AM, monitored device 138 may be configured to transmit an expected location notification, in one embodiment. In another embodiment, monitored device 138 may be configured to transmit no notification if the child is in school by 9:00 AM. However, if the child is not yet in school by 9:00 AM, monitored device 138 may be configured to transmit an unexpected location notification. For example, this notification may indicate that the child was to enter school at 9:00 AM but the child is elsewhere. In addition, when the child does enter school late, monitored device 138 may be configured to transmit another notification that the child is now entering the expected location at the current time.

As an example, a child using monitored device 138 may enter school at approximately 9:00 AM. As long as the child enters the school by 9:00 AM (or at any time between 8:00 AM and 9:00 AM, as shown in FIG. 3), monitored device 138 may consider itself to be in an expected location. Once monitored device 138 is within expected location 328, monitored device 138 may be configured to send an expected location notification to server device 110.

In some embodiments, monitored device 138 may be configured to monitor its own location. Monitored device 138 may determine its own location periodically (e.g., every 1 minute). For example, monitored device 138 may be connected to a Wi-Fi network or cellular data network. Monitored device 138 may interpret its location in terms of, for example, geographic coordinates or in terms of its distance or orientation from a Wi-Fi or cellular data network device. Monitored device 138 may also be configured to create virtual subsets of its surrounding location within a certain range. For example, monitored device 138 may divide its surrounding location into virtual tiles that may be smaller polygons of equal size (e.g., squares).

Monitored device 138 may be configured to compare its own location against the expected location provided within a received expected location configuration. For example, monitored device 138 may extract expected location information (e.g., geographic coordinates) from the received expected location configuration. Monitored device 138 may use the extracted expected location information to define a geofence for itself.

In some embodiments, monitored device 138 compares its own location to the expected location (e.g., a geofence) when the location changes beyond a threshold amount. For example, monitored device 138 may detect that it is in a first tile of the virtual tiles that were generated from the surrounding location as described above. Monitored device 138 may also detect that this first virtual tile overlaps with the defined geofence for the expected location. In other words, monitored device 138 may consider itself to be in the expected location. For example, a child using monitored device 138 may be in a first classroom of her school, which comprises the expected location.

Then monitored device 138 may detect that it has moved to a second virtual tile that is different from the first virtual tile. For example, the child may move to another classroom in the school. The change from the first virtual tile to the second virtual tile may prompt monitored device 138 to determine whether it is still in a virtual tile that overlaps with the geofence of the expected location. In one embodiment, monitored device 138 compares the second virtual tile with the geofence and determines that they overlap. So monitored device 138 determines that it is still in the expected location.

By contrast, the child may move from the first classroom (i.e., the first virtual tile) to a location outside the school, such as an outside street. Now monitored device 138 may detect that the second virtual tile does not overlap with the geofence of the expected location. Monitored device 138 may then check the time to see whether, at that time, monitored device 138 is still supposed to be inside the geofence of the expected location. If so, monitored device 138 may determine that the move to the second virtual tile has caused the monitored device 138 to leave the expected location for an unexpected location. Based on the determination monitored device 138 may be configured to transmit an unexpected location notification.

In another embodiment, monitored device 138 may determine whether it is in an expected location based on distance traveled. For example, monitored device 138 may be at a first location while an expected location configuration is in effect. Then monitored device 138 may move to a second location. The second location may be more than a threshold distance from the first location (e.g., more than 20 feet away). Monitored device 138 may determine that the location change is significant and requires checking whether it is still within the expected location. Monitored device 138 may compare its location against the expected location and determine that it is outside the expected location. Based on the determination, monitored device 138 may be configured to send an unexpected location notification as described above.

As described above, server device 110 may be configured to pass through only certain notifications to monitoring device 140. Based on a parent's configuration at monitoring device 140, notifications of expected behavior may be generated and sent to server device 110 but not forwarded to monitoring device 140. As shown in FIG. 4, server device 110 sends no notification to monitoring device 140. In other embodiments, notifications of expected behavior may not be generated at monitored device 138 at all.

Figure 5:
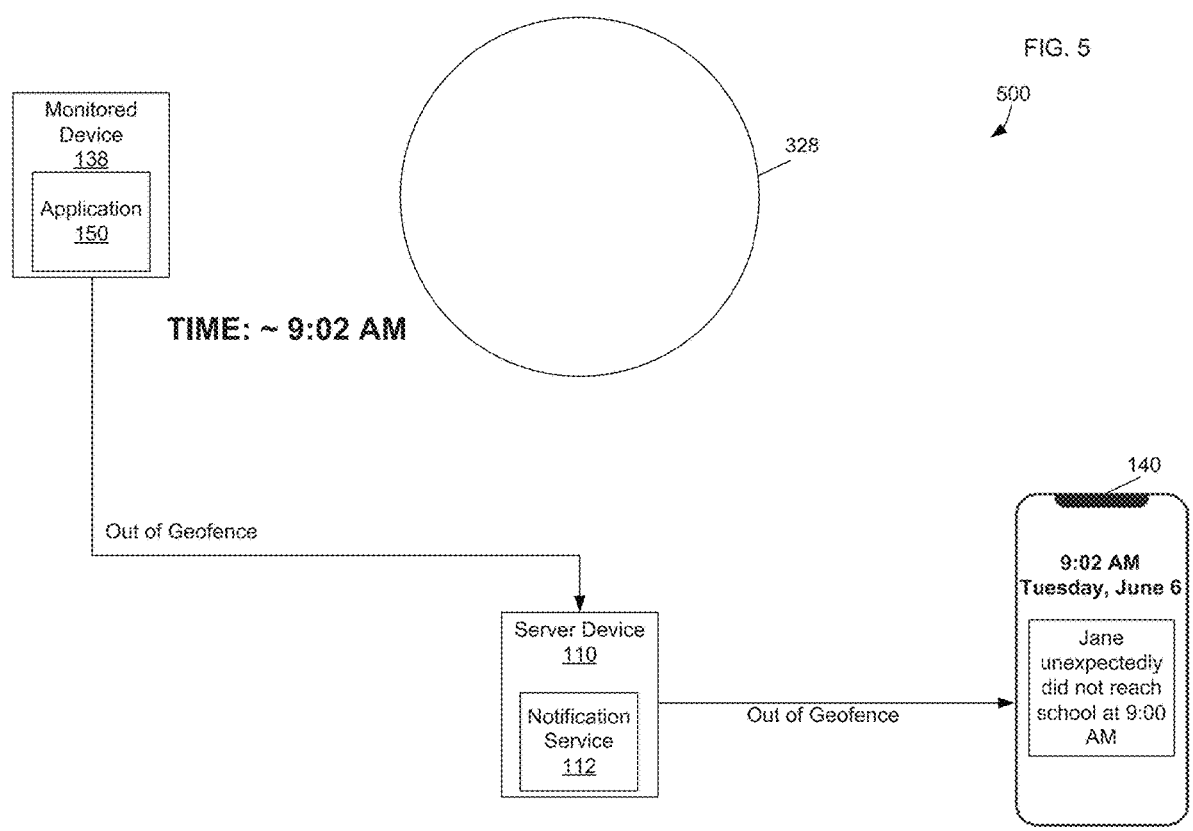
FIG. 5 is an example of a monitored device transmitting an unexpected location notification as it enters an expected location.

FIG. 5 is an example 500 of a monitored device transmitting an unexpected location notification as it enters an expected location. More specifically, FIG. 5 is an example of a monitored device transmitting a notification when it has failed to reach an expected location.

FIG. 5 shows that monitored device 138 has failed to enter expected location 328. For example, a child may be supposed to enter her school by 9:00 AM. In other words, the school is an expected location for that time. If the child fails to enter school by 9:00 AM, monitored device 138 may detect that it is not in an expected location. For example, the child may be late due to traffic and monitored device 138 may detect that it is on a public road, rather than inside the boundary of expected location 328. Accordingly, monitored device 138 may transmit an unexpected location notification (e.g., at 9:02 AM) to server device 110 indicating that monitored device 138 is unexpectedly outside the geofence that defines expected location 328.

In some embodiments, server device 110 may be configured to pass through the unexpected location notification to monitoring device 140. For example, a parent may receive the notification at monitoring device 140 and learn that her child has not yet entered school. In some embodiments, monitoring device 140 may be configured to display notification text that indicates that the child is not at an expected location. For example, the notification may state that "Jane did not reach school at the expected entry time of 9:00 AM."

In some embodiments, monitored device 138 may send a second notification once the child eventually enters the school (e.g., at 9:15 AM). In other embodiments, a second notification is not generated.

Figure 6:
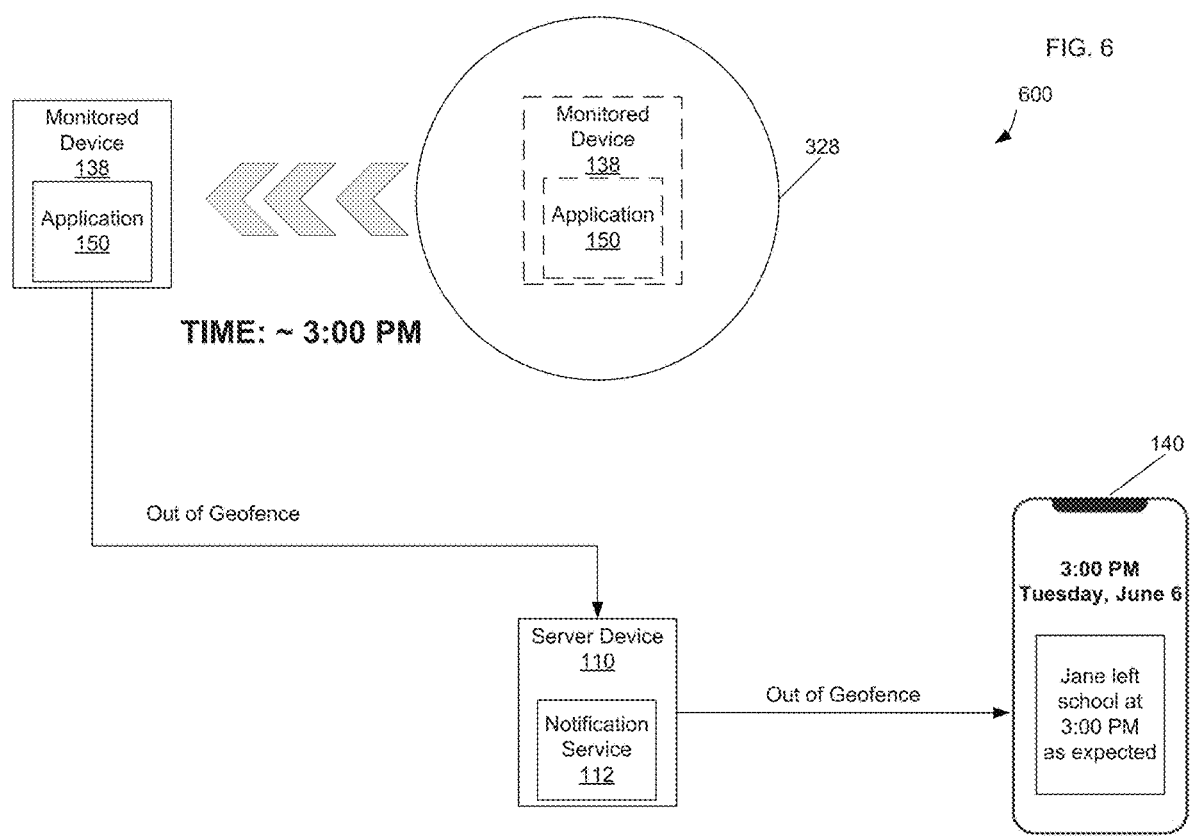
FIG. 6 is an example of a monitored device transmitting an expected location notification as it leaves an expected location.

FIG. 6 is another example 600 of a monitored device transmitting an expected location notification as it leaves an expected location. More specifically, FIG. 6 is an example of a monitored device transmitting a notification when it has left an expected location at an expected time.

FIG. 6 shows that monitored device 138 has left expected location 328 at approximately 3:00 PM. Continuing with the examples of FIGS. 2-5, FIG. 6 may show that a child has left school, an expected location, at 3:00 PM, an expected time. In some embodiments, leaving an expected location at the expected time may cause monitored device 138 to generate an expected location notification and transmit it to server device 110. Server device 110 may pass through the notification to monitoring device 140. In some embodiments, monitoring device 140 may be configured to display notification text that differs from that received in the example illustrated in FIG. 5. For example, the notification may state that "Jane left school at 3:00 PM as expected."

Figure 7:
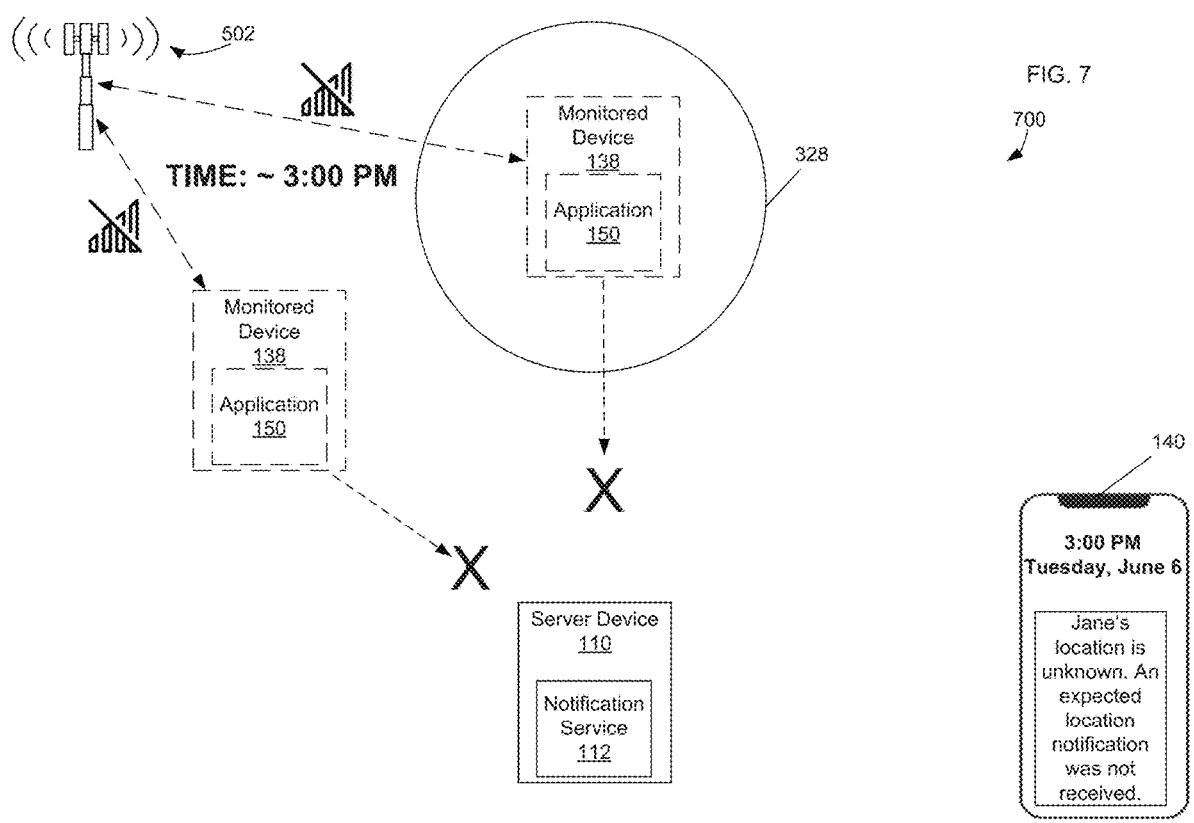
FIG. 7 illustrates a connectivity loss state for a monitored device in which a server device then notifies a monitoring device that the monitored device is unreachable.

FIG. 7 illustrates a connectivity loss state 700 for a monitored device in which a server device then notifies a monitoring device that the monitored device is unreachable.

Monitored device 138 may be configured to connect to a mobile data network via a network tower 502 (or one of many network towers that monitored device 138 may be near at any time). As another example, monitored device 138 may ordinarily connect to a Wi-Fi network or any other network that enables monitored device 138 to communicate with server device 110 and/or monitoring device 140.

One or more factors may cause monitoring device 138 to lose connectivity to a network. There may be technical issues, weather problems, device power loss, or monitored device 138 may be in an area with poor signal reception. There may be connectivity loss at a time when monitored device 138 is supposed to send a notification (e.g., that it is in an expected location or has left an expected location). Server device 110 may receive no notification of expected (or unexpected) location from monitored device 138 at a time when monitoring device 140 expected to receive a notification. Server device 110 may transmit nothing to monitoring device 140.

In some embodiments, monitoring device 140 may be configured to display a notification to the parent when an expected location notification is not received. Monitoring device 140 may display a location-unknown notification to the parent that indicates that the location of monitored device 138 cannot be determined. For example, monitoring device 140 may display a message stating that "Jane's location is unknown. An expected location notification was not received."

The example described above with respect to FIG. 7 illustrates that, in some embodiments, notifications are determined by whether a monitored device is observing that it is in an unexpected location. For example, in contrast to FIG. 7, monitored device 138 may lose connectivity in the middle of the day, such as at 12:00 PM. In the example of the child expected to be at school from 9:00 AM to 3:00 PM, no notification may be generated. Monitored device 138 was not configured to notify regarding its location at 12:00 PM. So, the connectivity loss event at 12:00 PM may not cause any notification to be generated because monitored device 138 did not determine that it is in an unexpected location.

Figure 8:
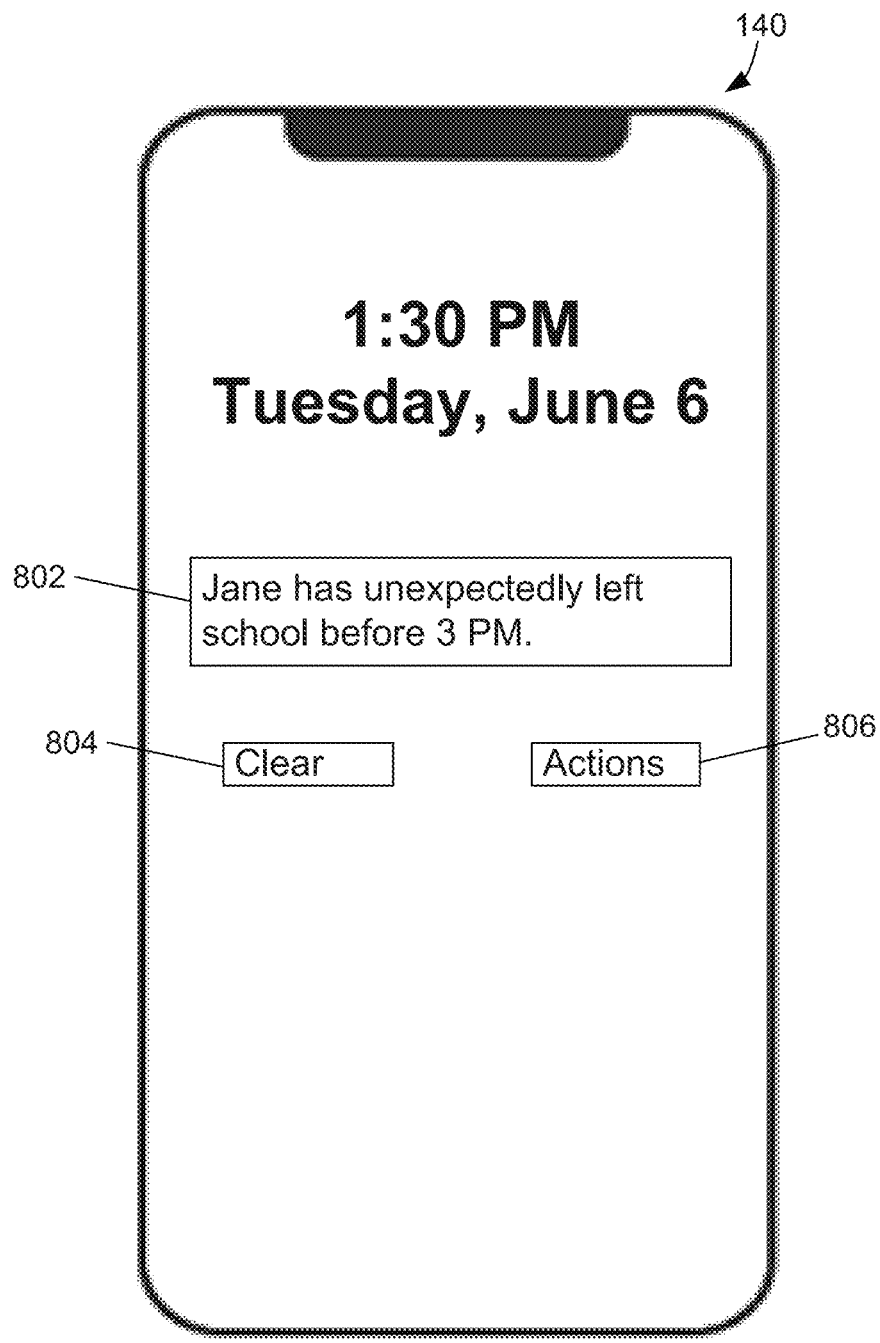
FIG. 8 shows a monitoring device as it receives an unexpected location notification.

FIG. 8 shows a monitoring device 140 as it receives an unexpected location notification. For example, a child may be supposed to be in school until 3:00 PM but may unexpectedly leave school at 1:30 PM. In response the child's monitored device 138 may generate and may transmit a notification indicating that the child has unexpectedly left an expected location too early. In some embodiments, monitoring device 140 may receive an unexpected location notification as shown in FIG. 8 and have options to take further action. For example, a parent may view the notification and simply clear or remove it using clear control 804. Alternatively, the parent may wish to take other actions and use actions control 806 to proceed. These actions are described with respect to FIG. 9.

Figure 9:
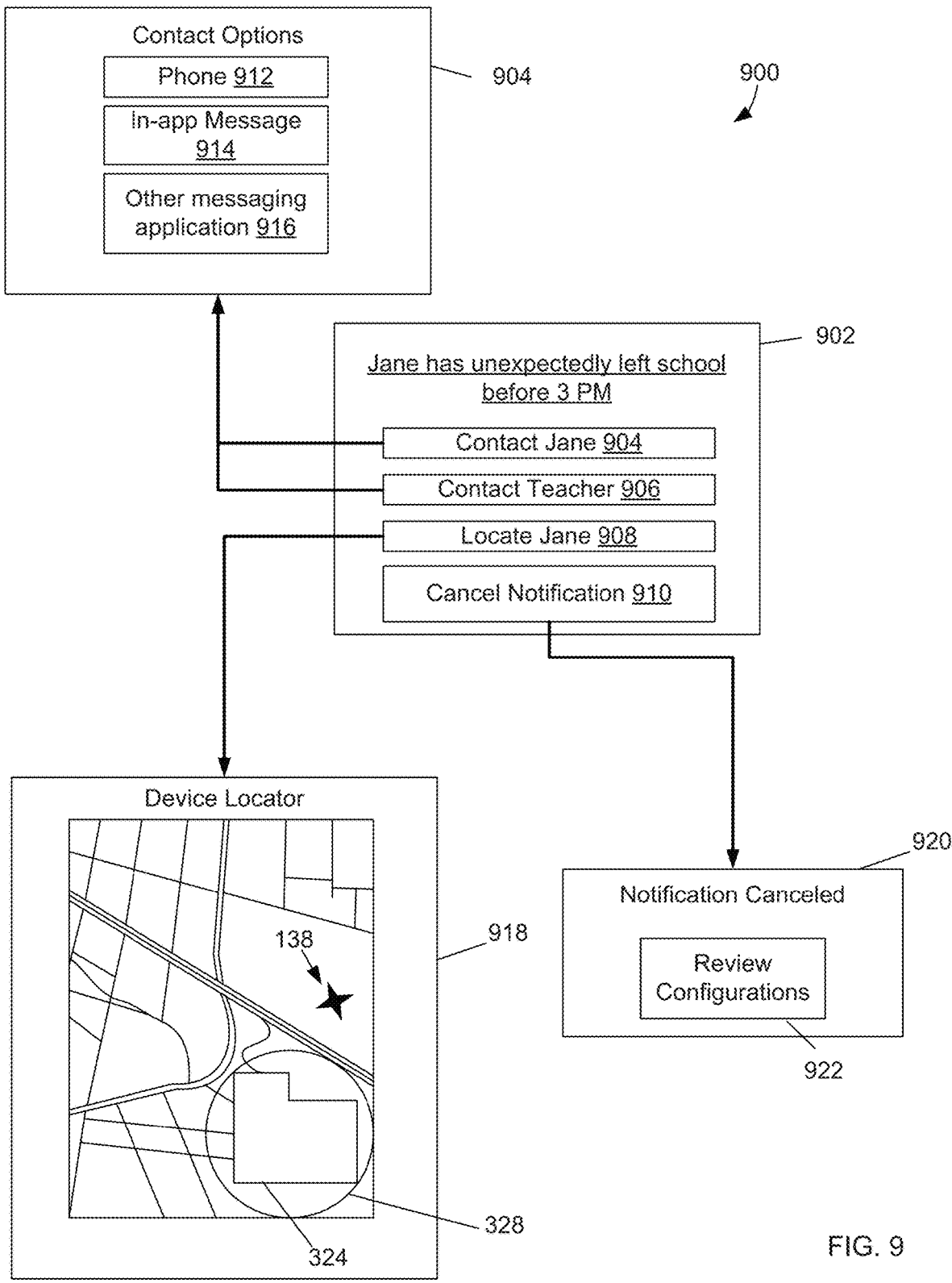
FIG. 9 shows an action flow that can be followed after receiving an unexpected location notification.

FIG. 9 shows an action flow 900 that can be followed after receiving an unexpected location notification. Stage 902 shows the unexpected location notification and actions including contact action 904, contact action 906, locate action 908, and cancel action 910. Contact action 904 can be used to contact monitored device 138 directly. For example, the parent may wish to contact the child in response to receiving the notification that the child is not in an expected location. Different options associated with contact action 904 are shown in stage 904. As shown, the parent may wish to contact the child using phone application 912. The parent may wish to send the child a text message (e.g., inquiring of the child's whereabouts). The parent may be able to send the child a text message using a text messaging application 914 built into configuration application 145. Additionally, the parent may be able to send the child a text message using a messaging application 916 that is distinct from configuration application 145.

Instead of contacting the child directly, the parent may wish to contact another person that the parent knows is near the child or is trusted with the child's safety. For example, when the parent receives the unexpected location notification, the parent may wish to contact one of the child's teachers (e.g., a teacher expected to be teaching the child at the time the parent received the unexpected location notification). Similar to contact action 904, the parent may use contact action 906 to contact the teacher and be presented with contact options 912, 914, and 916.

In response to receiving the unexpected location notification, the parent may also wish to locate the child. Using locate action 908, the parent may access a device locator 918. Device locator 918 enables a user to view the location of a monitored device. In some embodiments, device locator 918 is a feature of configuration application 145. In other embodiments, selecting locate action 908 on configuration application 145 causes a switch to a different application corresponding to device locator 918.

Device locator 918 may be configured to retrieve current location information for monitored device 138. In some embodiments, device locator 918 displays a map view showing the location of monitored device 138 as shown in FIG. 9. Device locator 918 may also be configured to show the expected location that monitored device 138 was supposed to be in. As shown in FIG. 9, device locator 918 shows expected location 328 surrounding building 324. For example, in FIG. 9, device locator 918 shows the school (building 324) the child was supposed to be in or near at 1:30 PM. However, an icon representing the child's location is shown to be well outside the expected location. The parent may wish to use device locator 918 first and then contact the child using contact action 904 in order to ask the child for details on the unexpected exit from school and the reason for the child's current location.

The parent may also consider the notification irrelevant or unnecessary and may wish to cancel the notification. In some embodiments, stage 902 also enables the parent to cancel the notification by selecting cancel action 910 and receiving cancellation confirmation via stage 920. Stage 920 also enables the parent to review configurations that are currently active using review control 922. For example, the parent may find the currently received notification to be unnecessary and review existing expected location configurations to make changes. In some embodiments, selecting review control 922 may cause monitoring device to show the configuration process of FIG. 3 for the expected location configuration that caused the currently received configuration.

Example Processes

To enable the reader to obtain a clear understanding of the technological concepts described herein, the following processes describe specific steps performed in a specific order. However, one or more of the steps of a particular process may be rearranged and/or omitted while remaining within the contemplated scope of the technology disclosed herein. Moreover, different processes, and/or steps thereof, may be combined, recombined, rearranged, omitted, and/or executed in parallel to create different process flows that are also within the contemplated scope of the technology disclosed herein. Additionally, while the processes below may omit or briefly summarize some of the details of the technologies disclosed herein for clarity, the details described in the paragraphs above may be combined with the process steps described below to get a more complete and comprehensive understanding of these processes and the technologies disclosed herein.

Figure 10:
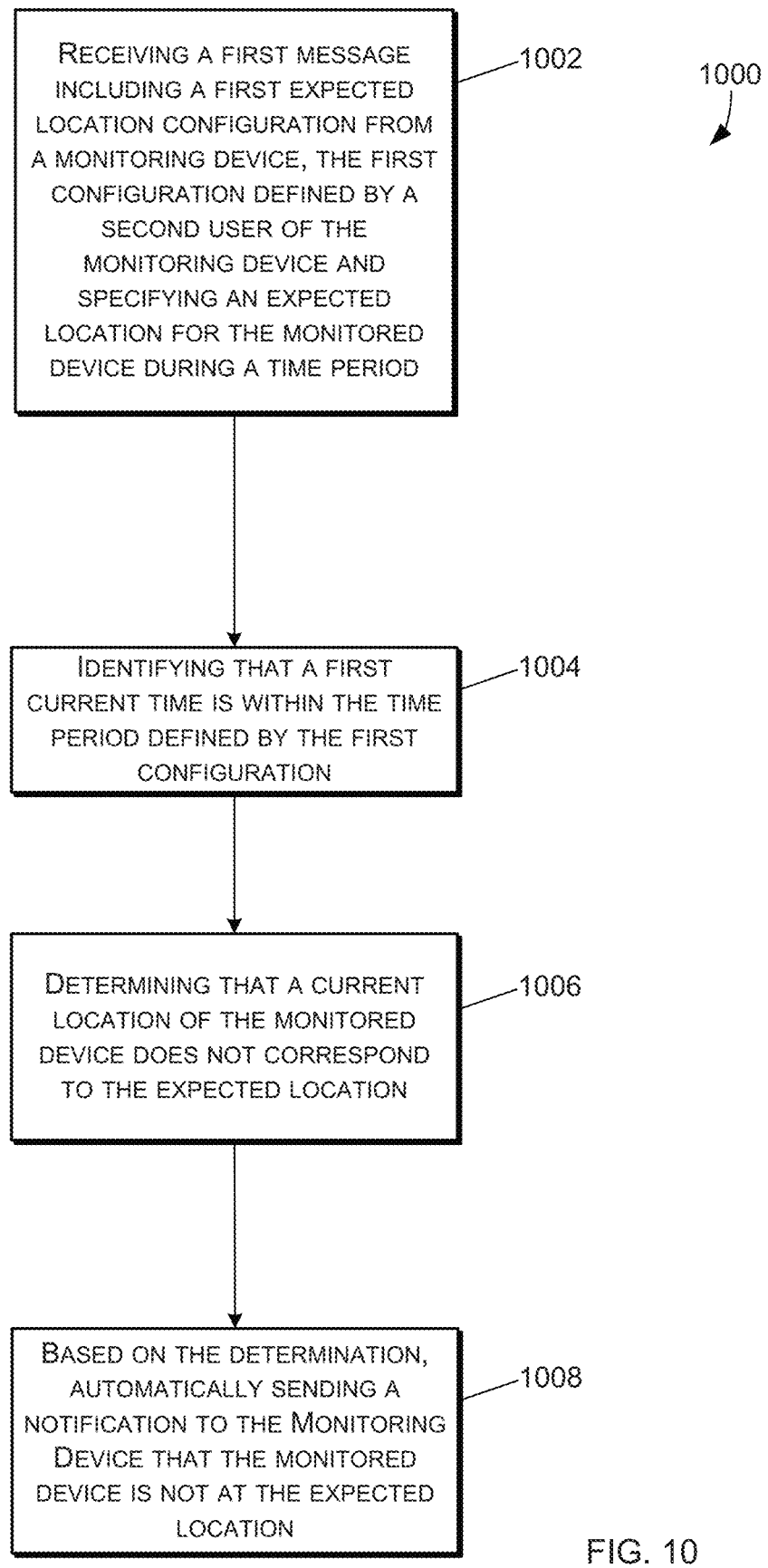
FIG. 10 is a flow diagram of an example process for unexpected location notifications performed by a monitored device.

FIG. 10 is a flow diagram of an example process 1000 for expected location configurations for monitored devices. For example, process 1000 can be performed by a computing device (e.g., monitored device 138).

At step 1002, monitored device 138 may be configured to receive a first message including a first expected location configuration. As described above, monitored device 138 may receive expected location configurations via server device 110 from monitoring device 140. In some embodiments, the expected location configuration is defined by a user of monitoring device 140. For example, a parent using monitoring device 140 will implement an expected location configuration for a child using monitored device 138. The expected location configuration specifies an expected location for the monitored device during a particular time period.

Once the expected location configuration is active, monitored device 138 may be configured to periodically check its own location, compare it to the expected location, and check the current time to determine whether monitored device 138 is within the expected location. A location may be an expected location at one time but become an unexpected location at a later time that exceeds the time period specified in the expected location configuration. Accordingly, at step 1004, monitored device 138 may be configured to identify the current time. For example, monitored device 138 may determine that the current time is within the specified time period and that, at the current time, monitored device 138 is within the expected location. As a result, monitored device 138 may not generate any notification.

However, at a later time, monitored device 138 may perform another location check and determine that it is no longer within the expected location, even though it is still within the specified time period. Accordingly, step 1006 shows that monitored device 138 determines that a current location of the monitored device does not correspond to the expected location. Based on the expected location configuration, monitored device 138 may be configured to send a notification in this situation. Accordingly, at step 1008, monitored device 138 automatically sends a notification to monitoring device 140 that monitored device 138 is not at the expected location. As described above with respect to FIG. 1, monitored device 138 may transmit the notification to server device 110, which forwards the notification to monitoring device 140.

In an alternative situation, the current time may exceed the time period specified in the expected location configuration but monitored device 138 may still be at the (previously) expected location. After the specified time period, monitored device 138 may be configured to treat the expected location as an unexpected location. For example, the time period may be specified as 9:00 AM to 3:00 PM during which time monitored device 138 was to remain within an expected location (e.g., a child was to remain within a school). But monitored device 138 may detect that it is still within the (previously) expected location, but the current time may now be 3:15 PM. In such a situation, monitored device 138 may also be configured, as shown by step 1008, to automatically send a notification to monitoring device 140 that monitored device 138 is not at an expected location.

Figure 11:
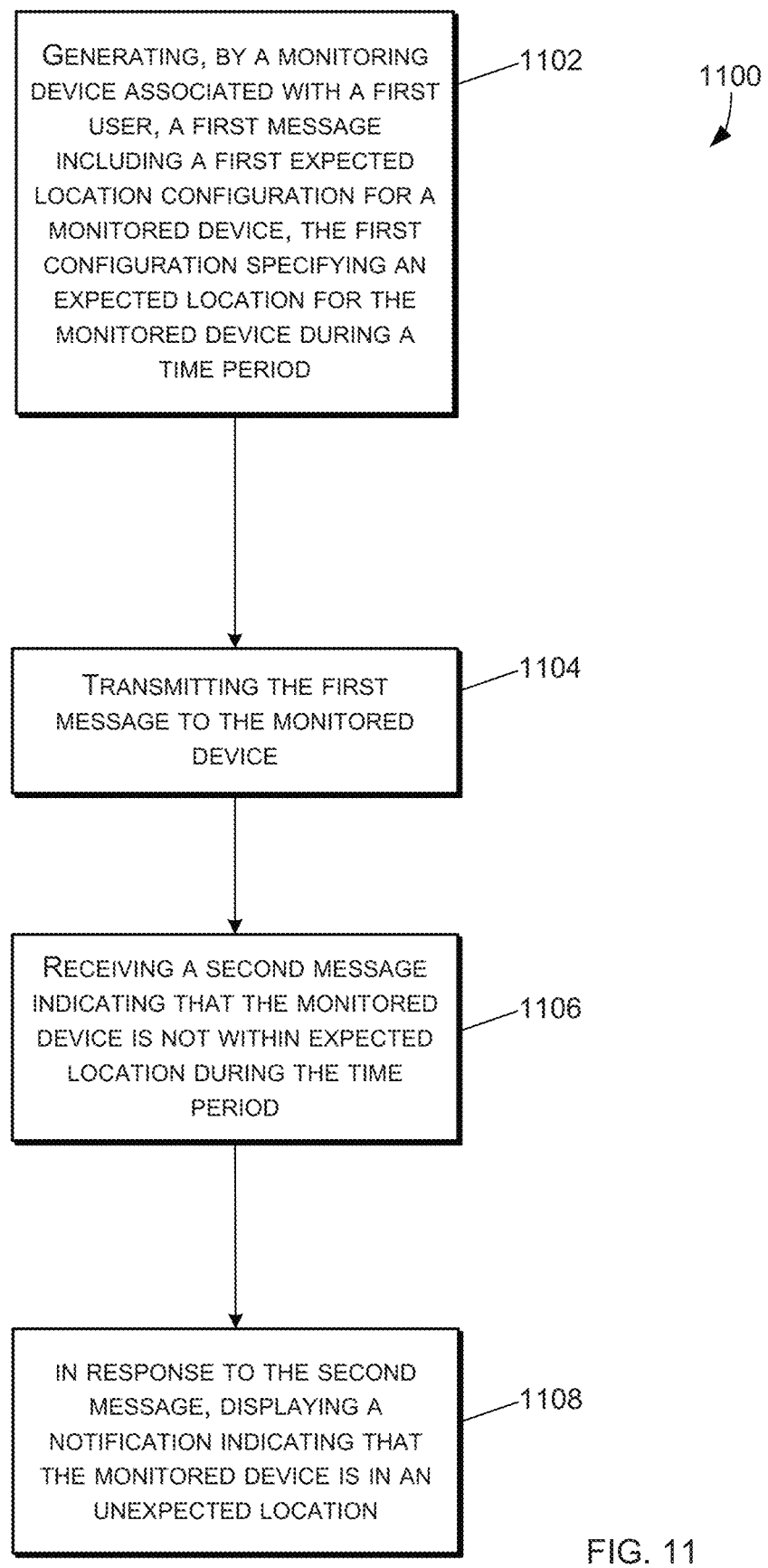
FIG. 11 is another flow diagram of an example process for unexpected location notifications performed by a monitoring device.

FIG. 11 is a flow diagram 1100 of another example process for expected location configurations for monitored devices. For example, process 1100 can be performed by a computing device (e.g., monitoring device 140).

Monitoring device 140 may be configured, at step 1102, to generate a first message including a first expected location configuration for a monitored device. In some embodiments, the expected location configuration specifies an expected location for the monitored device during a time period. For example, a parent using monitoring device 140 will implement an expected location configuration for a child that is using monitored device 138. The expected location configuration specifies an expected location for the monitored device during a particular time period.

Step 1104 shows that monitoring device 140 may transmit the first message to the monitored device 138. As described above with respect to FIG. 1, monitoring device 140 may transmit expected location configurations to monitored device 138 through server device 110. Server device 110 may be configured to pass through expected location configuration information, part of which may be encrypted.

As shown at step 1106, monitoring device 140 receives, from the monitored device, a second message that indicates that the monitored device is not within the expected location during the time period. As described above with respect to FIG. 10, monitored device 138 may notice that it is not within an expected location, or is in a previously expected location but past the time period specified in the expected location configuration. Monitoring device 140 receives a notification (through server device 110) from monitored device 138. In some embodiments, the notification is displayed on a display screen of monitoring device 140 as shown by step 1108. For example, a parent may review the notification and elect to take one or more actions in response to the notification. As described above with respect to FIGS. 8 and 9, the parent may elect to contact the child, contact another person, locate the child, or cancel or edit the expected location configuration.

Graphical User Interfaces

This disclosure above describes various Graphical User Interfaces (GUIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radio buttons, checkboxes and any other mechanism for receiving input from, or providing feedback to a user.

Privacy

As described above, one aspect of the present technology is the gathering and use of data available from various sources to perform functions for unexpected location notifications. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The expected location configurations that may be specified by a user, (e.g., configurations based on time, geolocation, device environment/condition, etc.), as well as any communications corresponding to those configurations, may be encrypted in an end-to-end encrypted manner as described herein. In this way, the configuration data is only accessible by the devices associated with the user (e.g., and/or children) and not by a server (e.g., server 110), thereby protecting user privacy.

The present disclosure recognizes that the use of such personal information data, in the present technology, can be used to the benefit of users. For example, the personal information data can be used to actively detect changes in geospatial entities using trend analysis. Further, other uses for personal information data that benefit the user are also contemplated by the present disclosure. For instance, health and fitness data may be used to provide insights into a user's general wellness or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of unexpected location notifications, the present technology can be configured to allow users to select to "opt in" or "opt out" of participation in the collection of personal information data during registration for services or anytime thereafter. In another example, users can select not to provide location data for unexpected location notifications. In yet another example, users can select to limit the length of time location data is maintained or entirely prohibit the development of location data for unexpected location notifications. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, expected location configurations may be performed based on non-personal information data or a bare minimum amount of personal information, such as the content being requested by the device associated with a user, other non-personal information available to the active change detection system, or publicly available information.

Example System Architecture

Figure 12:
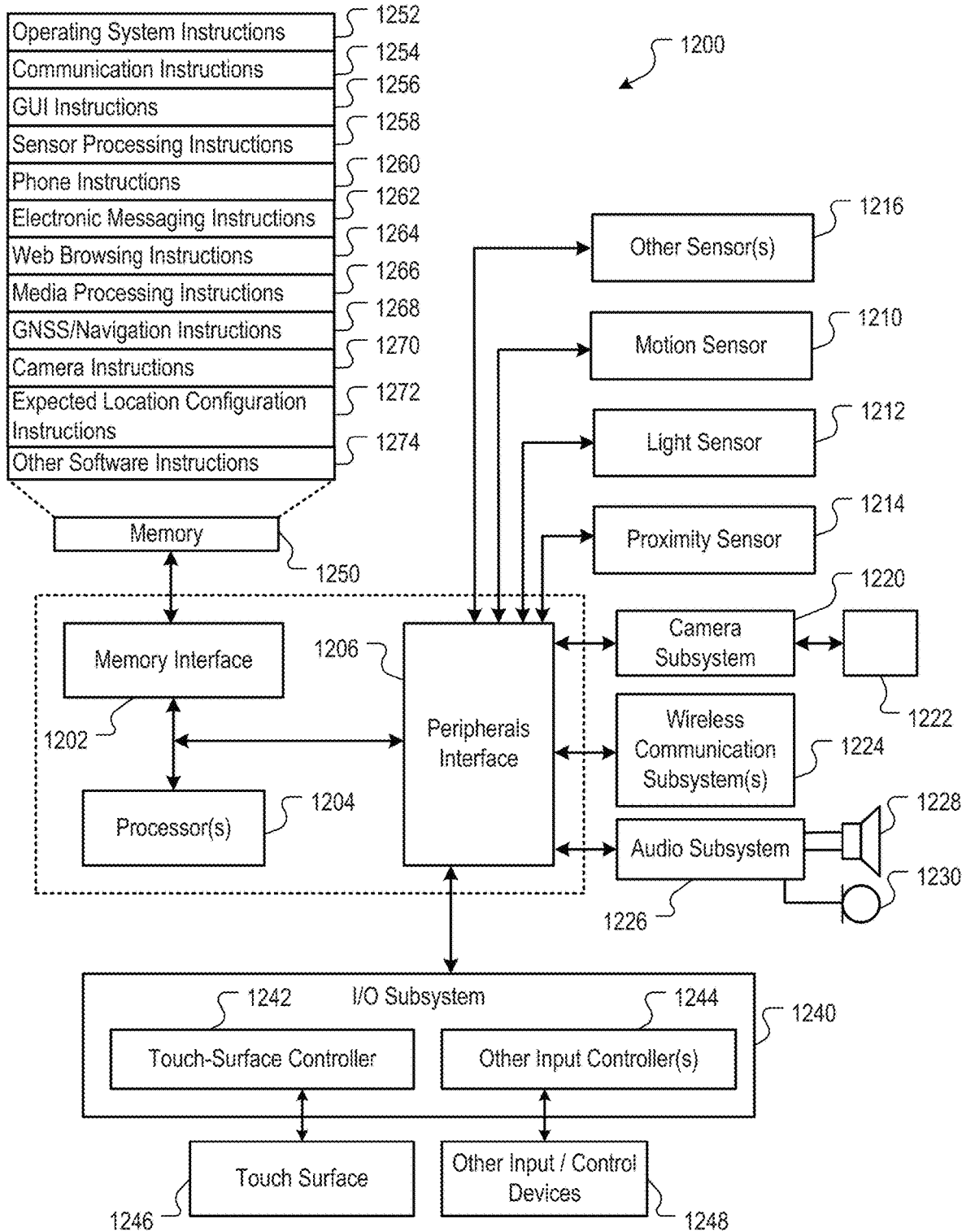
FIG. 12 is a block diagram of an example computing device that can implement the features and processes of FIGS. 1-11.

FIG. 12 is a block diagram of an example computing device 1200 that can implement the features and processes of FIGS. 1-11. The computing device 1200 can include a memory interface 1202, one or more data processors, image processors and/or central processing units 1204, and a peripherals interface 1206. The memory interface 1202, the one or more processors 1204 and/or the peripherals interface 1206 can be separate components or can be integrated in one or more integrated circuits. The various components in the computing device 1200 can be coupled by one or more communication buses or signal lines.

Sensors, devices, and subsystems can be coupled to the peripherals interface 1206 to facilitate multiple functionalities. For example, a motion sensor 1210, a light sensor 1212, and a proximity sensor 1214 can be coupled to the peripherals interface 1206 to facilitate orientation, lighting, and proximity functions. Other sensors 1216 can also be connected to the peripherals interface 1206, such as a global navigation monitored system (GNSS) (e.g., GPS receiver), a temperature sensor, a biometric sensor, magnetometer or other sensing device, to facilitate related functionalities.

A camera subsystem 1220 and an optical sensor 1222, e.g., a charged coupled device (CCD) or a complementary metal-oxide semiconductor (CMOS) optical sensor, can be utilized to facilitate camera functions, such as recording photographs and video clips. The camera subsystem 1220 and the optical sensor 1222 can be used to collect images of a user to be used during authentication of a user, e.g., by performing facial recognition analysis.

Communication functions can be facilitated through one or more wireless communication subsystems 1224, which can include radio frequency receivers and transmitters and/or optical (e.g., infrared) receivers and transmitters. The specific design and implementation of the communication subsystem 1224 can depend on the communication network (s) over which the computing device 1200 is intended to operate. For example, the computing device 1200 can include communication subsystems 1224 designed to operate over a GSM network, a GPRS network, an EDGE network, a Wi-Fi or WiMax network, and a Bluetooth™ network. In particular, the wireless communication subsystems 1224 can include hosting protocols such that the device 100 can be configured as a base station for other wireless devices.

An audio subsystem 1226 can be coupled to a speaker 1228 and a microphone 1230 to facilitate voice-enabled functions, such as speaker recognition, voice replication, digital recording, and telephony functions. The audio subsystem 1226 can be configured to facilitate processing voice commands, voiceprinting and voice authentication, for example.

The I/O subsystem 1240 can include a touch-surface monitoring 1242 and/or other input monitoring(s) 1244. The touch-surface monitoring 1242 can be coupled to a touch surface 1246. The touch surface 1246 and touch-surface monitoring 1242 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 1246.

The other input monitoring(s) 1244 can be coupled to other input/control devices 1248, such as one or more buttons, rocker switches, thumb-wheel, infrared port, USB port, and/or a pointer device such as a stylus. The one or more buttons (not shown) can include an up/down button for volume control of the speaker 1228 and/or the microphone 1230.

In one implementation, a pressing of the button for a first duration can disengage a lock of the touch surface 1246; and a pressing of the button for a second duration that is longer than the first duration can turn power to the computing device 1200 on or off. Pressing the button for a third duration can activate a voice control, or voice command, module that enables the user to speak commands into the microphone 1230 to cause the device to execute the spoken command. The user can customize a functionality of one or more of the buttons. The touch surface 1246 can, for example, also be used to implement virtual or soft buttons and/or a keyboard.

In some implementations, the computing device 1200 can present recorded audio and/or video files, such as MP3, AAC, and MPEG files. In some implementations, the computing device 1200 can include the functionality of an MP3 player, such as an iPod™.

The memory interface 1202 can be coupled to memory 1250. The memory 1250 can include high-speed random-access memory and/or non-volatile memory, such as one or more magnetic disk storage devices, one or more optical storage devices, and/or flash memory (e.g., NAND, NOR). The memory 1250 can store an operating system 1252, such as Darwin, RTXC, LINUX, UNIX, OS X, WINDOWS, or an embedded operating system such as VxWorks.

The operating system 1252 can include instructions for handling basic system services and for performing hardware dependent tasks. In some implementations, the operating system 1252 can be a kernel (e.g., UNIX kernel). In some implementations, the operating system 1252 can include instructions for performing voice authentication. For example, operating system 1252 can implement the features for expected location configurations as described with reference to FIGS. 1-11.

The memory 1250 can also store communication instructions 1254 to facilitate communicating with one or more additional devices, one or more computers and/or one or more servers. The memory 1250 can include graphical user interface instructions 1256 to facilitate graphic user interface processing; sensor processing instructions 1258 to facilitate sensor-related processing and functions; phone instructions 1260 to facilitate phone-related processes and functions; electronic messaging instructions 1262 to facilitate electronic-messaging related processes and functions; web browsing instructions 1264 to facilitate web browsing-related processes and functions; media processing instructions 1266 to facilitate media processing-related processes and functions; GNSS/Navigation instructions 1268 to facilitate GNSS and navigation-related processes and instructions; and/or camera instructions 1270 to facilitate camera-related processes and functions.

The memory 1250 can store software instructions 1272 to facilitate other processes and functions, such as the processes and functions for expected location configurations as described with reference to FIGS. 1-11.

The memory 1250 can also store other software instructions 1274, such as web video instructions to facilitate web video-related processes and functions; and/or web shopping instructions to facilitate web shopping-related processes and functions. In some implementations, the media processing instructions 1266 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 850 can include additional instructions or fewer instructions. Furthermore, various functions of the computing device 800 can be implemented in hardware and/or in software, including in one or more signal processing and/or application specific integrated circuits.

What is claimed is:

1. A method comprising:
   receiving, by a first device associated with a first user, expected location configuration from a second device associated with a second user, the expected location configuration specifying a time period defined by a start time and an end time, and a geographical area within which the first device is expected to be during the specified time period;
   determining, by the first device, a current time is within the time period specified in the expected location configuration;
   determining, by the first device, that, at each of a plurality of times between the start time of the time period and the current time, a location of the first device has been distinct from the geographical area specified by the expected location configuration; and
   in response to determining that the location of the first device has been distinct from the geographical area specified by the expected location configuration at each of the plurality of times between the start time and the current time, sending, by the first device, a first notification to the second device indicating that the first device is not within the geographical area.

2. The method of claim 1, further comprising:
   determining that the location of the first device has moved into the geographical area specified by the expected location configuration at a first time within the time period specified by the expected location configuration; and
   sending, by the first device, a second notification to the second device indicating that the first device is within the geographical area.

3. The method of claim 1, wherein the expected location configuration specifies a grace period for entering the geographic area, and further comprising:
   sending, by the first device, a first notification to the second device indicating that the first device is not within the geographical area when the first device has not entered the geographical area by a second time corresponding to the current time plus the grace period.

4. The method of claim 1, wherein the expected location configuration specifies a grace period for entering the geographic area, and further comprising:
   delaying the sending of the first notification for a period of time specified by the grace period.

5. The method of claim 1, further comprising:
   determining, by the first device, that the first device has moved from within the geographic location to outside the geographic area within the specified time period; and
   sending a third notification to the second device indicating that the first device has moved out of the geographic area.

6. The method of claim 5, further comprising:
   determining, by the first device, that the first device has moved from within the geographic location to outside the geographic area at a third time within the specified time period; and
   sending a third notification to the second device indicating that the first device has moved out of the geographic area after a threshold period of time has elapsed starting at the third time.

7. The method of claim 1, further comprising:
   receiving, by the first device associated with the first user, expected location configuration directly from the second device associated with the second user through a peer to peer connection.

8. A non-transitory computer readable medium including one or more sequences of instructions that, when executed by one or more processors, cause the processors to perform operations comprising:

receiving, by a first device associated with a first user, expected location configuration from a second device associated with a second user, the expected location configuration specifying a time period defined by a start time and an end time, and a geographical area within which the first device is expected to be during the specified time period;

determining, by the first device, a current time is within the time period specified in the expected location configuration;

determining, by the first device, that, at each of a plurality of times between the start time of the time period and the current time, a location of the first device has been distinct from the geographical area specified by the expected location configuration; and in response to determining that the location of the first device has been distinct from the geographical area specified by the expected location configuration at each of the plurality of times between the start time and the current time, sending, by the first device, a first notification to the second device indicating that the first device is not within the geographical area.

9. The non-transitory computer readable medium of claim 8, wherein the instructions cause the processors to perform operations comprising:

determining that the location of the first device has moved into the geographical area specified by the expected location configuration at a first time within the time period specified by the expected location configuration; and sending, by the first device, a second notification to the second device indicating that the first device is within the geographical area.

10. The non-transitory computer readable medium of claim 8, wherein the expected location configuration specifies a grace period for entering the geographic area, and wherein the instructions cause the processors to perform operations comprising:

sending, by the first device, a first notification to the second device indicating that the first device is not within the geographical area when the first device has not entered the geographical area by a second time corresponding to the current time plus the grace period.

11. The non-transitory computer readable medium of claim 8, wherein the expected location configuration specifies a grace period for entering the geographic area, and wherein the instructions cause the processors to perform operations comprising:

delaying the sending of the first notification for a period of time specified by the grace period.

12. The non-transitory computer readable medium of claim 8, wherein the instructions cause the processors to perform operations comprising:

determining, by the first device, that the first device has moved from within the geographic location to outside the geographic area within the specified time period; and sending a third notification to the second device indicating that the first device has moved out of the geographic area.

13. The non-transitory computer readable medium of claim 12, wherein the instructions cause the processors to perform operations comprising:

determining, by the first device, that the first device has moved from within the geographic location to outside the geographic area at a third time within the specified time period; and sending a third notification to the second device indicating that the first device has moved out of the geographic area after a threshold period of time has elapsed starting at the third time.

14. The non-transitory computer readable medium of claim 8, wherein the instructions cause the processors to perform operations comprising:

receiving, by the first device associated with the first user, expected location configuration directly from the second device associated with the second user through a peer to peer connection.

15. A system comprising:

one or more processors; and a non-transitory computer readable medium including one or more sequences of instructions that, when executed by the one or more processors, cause the processors to perform operations comprising:

receiving, by a first device associated with a first user, expected location configuration from a second device associated with a second user, the expected location configuration specifying a time period defined by a start time and an end time, and a geographical area within which the first device is expected to be during the specified time period;

determining, by the first device, a current time is within the time period specified in the expected location configuration;

determining, by the first device, that, at each of a plurality of times between the start time of the time period and the current time, a location of the first device has been distinct from the geographical area specified by the expected location configuration; and in response to determining that the location of the first device has been distinct from the geographical area specified by the expected location configuration at each of the plurality of times between the start time and the current time, sending, by the first device, a first notification to the second device indicating that the first device is not within the geographical area.

16. The system of claim 15, wherein the instructions cause the processors to perform operations comprising:

determining that the location of the first device has moved into the geographical area specified by the expected location configuration at a first time within the time period specified by the expected location configuration; and sending, by the first device, a second notification to the second device indicating that the first device is within the geographical area.

17. The system of claim 15, wherein the expected location configuration specifies a grace period for entering the geographic area, and wherein the instructions cause the processors to perform operations comprising:

sending, by the first device, a first notification to the second device indicating that the first device is not within the geographical area when the first device has not entered the geographical area by a second time corresponding to the current time plus the grace period.

18. The system of claim 15, wherein the expected location configuration specifies a grace period for entering the geographic area, and wherein the instructions cause the processors to perform operations comprising:

delaying the sending of the first notification for a period of time specified by the grace period.

19. The system of claim 15, wherein the instructions cause the processors to perform operations comprising:

determining, by the first device, that the first device has moved from within the geographic location to outside the geographic area within the specified time period; and sending a third notification to the second device indicating that the first device has moved out of the geographic area.

20. The system of claim 19, wherein the instructions cause the processors to perform operations comprising:

determining, by the first device, that the first device has moved from within the geographic location to outside the geographic area at a third time within the specified time period; and sending a third notification to the second device indicating that the first device has moved out of the geographic area after a threshold period of time has elapsed starting at the third time.

21. The system of claim 15, wherein the instructions cause the processors to perform operations comprising:

receiving, by the first device associated with the first user, expected location configuration directly from the second device associated with the second user through a peer to peer connection.

* * * * *